United States Patent [19]

Brownscombe

[11] Patent Number: 5,053,372

[45] Date of Patent: Oct. 1, 1991

[54] BASIC ALKALINE EARTH METAL-ZEOLITE COMPOSITIONS

[75] Inventor: Thomas F. Brownscombe, Houston, Tex.

[73] Assignee: Shell Oil Company, Houston, Tex.

[21] Appl. No.: 387,265

[22] Filed: Jul. 31, 1989

[51] Int. Cl.$^5$ .................. B01J 29/06; B01J 29/08; B01J 29/18

[52] U.S. Cl. ............................. 502/60; 502/78; 502/79

[58] Field of Search .................. 502/60, 78, 79

[56] References Cited

U.S. PATENT DOCUMENTS

| | | | |
|---|---|---|---|
| 2,908,549 | 10/1959 | Estes | 502/60 |
| 2,962,355 | 11/1960 | Breck et al. | 502/60 |
| 2,971,824 | 2/1961 | Johnson et al. | 502/60 |
| 3,013,986 | 12/1961 | Castor | 502/79 |
| 3,013,989 | 12/1961 | Freeman, Jr. | 502/79 |
| 4,140,726 | 2/1979 | Unland et al. | 260/668 B |
| 4,822,825 | 4/1989 | Bhattacharya et al. | 518/714 |

OTHER PUBLICATIONS

Barthomeuf et al., "Basicity and Basic Properties of Zeolites, Materials Chemistry and Physics", 18 (1988), 553–575.
Martens et al., "Sodium Clusters in Large Pore Zeolites as Basic Catalysts".
Rabo et al., "Studies of Cations in Zeolites".
Martens et al., "Preparation and Catalytic Properties of Ionic Sodium Clusters in Zeolites", Nature, 315, 568–70 (1985).
Yoon et al., "Novel Synthesis of Ionic Clusters ($Na_4^{3+}$) in Zeolites", J. Chem. Soc., Chem. Commun., 510–11 (1988).
Harrison et al., "Ionic and Metallic Clusters of the Alkali Metals in Zeolite Y", J. Solid State Chem., 54, 330–341 (1984).
Martens et al., "Sodium Clusters in Zeolites as Active Sites for Carbanion Catalyzed Reactions".
Engelhardt et al., "Alkylation of Toluene with Methanol on Commercial X Zeolite in Different Alkali Cation Forms", J. Cat., 107, 296–306 (1987).
Hathaway et al., "Base Catalysis by Alkali-Modified Zeolites", J. Cat., 116, 263–284 (1989).

*Primary Examiner*—Carl F. Dees

[57] ABSTRACT

This invention relates to basic compositions comprising a zeolite and an alkaline earth metal compound wherein the sum of the amount of the alkaline earth metal in the compound plus any metal cation exchanged into the zeolite is in excess of that required to provide a fully metal cation-exchanged zeolite. This invention further relates to methods for preparing the instant compositions. In a preferred embodiment the instant compositions are prepared by impregnating a zeolite with a solution of an alkaline earth metal salt wherein said alkaline earth metal impregnated in the zeolite is in excess of that required to provide a fully metal cation-exchanged zeolite, precipitating out an insoluble alkaline earth metal compound within the zeolite by contact with a precipitation agent, and/or drying the resultant impregnated/(precipitated) material and then calcining the resultant composition.

24 Claims, No Drawings

BASIC ALKALINE EARTH METAL-ZEOLITE COMPOSITIONS

FIELD OF THE INVENTION

This invention relates to basic alkaline earth metal-containing zeolite compositions and methods for their preparation.

BACKGROUND OF THE INVENTION

Zeolites are crystalline aluminosilicate minerals of a cage-network structure with pores a few angstroms in diameter. Some of the common materials, such as zeolite Y (faujasite) or zeolite A have a three dimensional structure with pore intersections ("supercages") somewhat larger than the pore size. Others such as zeolite L have channels with diffusional cross connections. Zeolites are useful as shape selective adsorbents for a variety of organic molecules and shape selective catalysts for a variety of chemical processes.

Levels of hydration of zeolites determine the number of Si-OH and Al-OH species present. The interaction of such hydroxyl groups with the aluminum oxide centers is generally thought to yield protonic (Bronsted) acid sites, while the aluminum oxide centers themselves and the exchanged cations are capable of serving as electron acceptor (Lewis acid) sites. Normal zeolitic materials have acid activity, and even if they are neutralized with base, such as with the conversion of H-zeolite to Na-zeolite, they retain some acid character. Some references consider zeolites exchanged with alkali metal cations to have some soft base sites, with an excess of acidic sites and some basic sites coexisting simultaneously. See, for example, Barthomeuf et.al; "Basicity and Basic Catalytic Properties of Zeolites", Materials Chemistry and Physics, 18 (1988) 553–575. Further see Unland et.al; U.S. Pat. No. 4,140,726, issued Feb. 20, 1979, particularly at column 5, lines 39–44. However, neither of these references teach the use of alkaline earth metal compounds in conjunction with a zeolite wherein the amount of alkaline earth metal present exceeds that required to provide a fully metal cation-exchanged zeolite. The acidic properties of zeolites allow them to be used to catalyze acid-catalyzed reactions such as cracking, rearrangements, alkylation of aromatic rings, etc. However, since all known zeolites, including ion exchanged materials, exhibit acid catalytic properties, it would thus be of considerable economic importance to produce materials having the narrow channels and potential for shape selective catalysis of zeolites wherein the basic properties of such materials predominated over the acidic properties, if any, present in the materials. Such materials would be useful for a variety of reactions such as side chain alkylation of aromatics, olefin oligomerization, selective oxidation, condensations and double bond isomerization without skeletal rearrangement which are difficult to achieve with normal acid zeolites.

SUMMARY OF THE INVENTION

This invention relates to basic compositions comprising a zeolite and an alkaline earth metal compound wherein the sum of the amount of the alkaline earth metal in the compound plus any metal cation exchanged into the zeolite is in excess of that required to provide a fully metal cation-exchanged zeolite. This invention further relates to methods for preparing the instant compositions. In a preferred embodiment the instant compositions are prepared by impregnating a zeolite with a solution of an alkaline earth metal salt wherein said alkaline earth metal impregnated in the zeolite is in excess of that required to provide a fully metal cation-exchanged zeolite, drying the resultant impregnated material and then calcining the resultant composition. Preferred alkaline earth metal salts used in the impregnation are those which at least partially decompose in the presence of the zeolite to oxides or oxidic compounds upon heating to temperatures below about 850° C. Preferred calcining conditions generally range from about 150° C. to about 850° C. in neutral or oxidizing atmospheres.

In an alternatively preferred embodiment, the instant compositions are prepared by impregnating a zeolite with a solution of a soluble salt of an alkaline earth metal salt wherein said alkaline earth metal impregnated in the zeolite is in excess of that required to provide a fully metal cation-exchanged zeolite, followed by contact of the zeolite with a precipitating agent than causes the precipitation of an insoluble alkaline earth metal compound in the zeolite. The resultant material is dried to remove solvent and optionally calcined.

It is an object of this invention to provide alkaline earth metal-zeolite compositions which are basic in nature and would be particularly suitable for the adsorption of acidic gases and for the catalysis of base-catalyzed reactions. The instant compositions are also useful as supports for other catalytic components.

DETAILED DESCRIPTION OF THE INVENTION

Essentially any crystalline zeolitic aluminosilicate can be employed to prepare the compositions of the instant invention. The zeolites can include both synthetic and naturally occurring zeolites. Illustrative of the synthetic zeolites are Zeolite X, U.S. Pat. Nos. 2,882,244; Zeolite Y, 3,130,007; Zeolite A, 2,882,243; Zeolite L, Bel. 575,117; Zeolite D, Can. 611,981; Zeolite R, 3,030,181; Zeolite S, 3,054,657; Zeolite T, 2,950,952; Zeolite Z, Can. 614,995; Zeolite E, Can. 636,931; Zeolite F, 2,995,358; Zeolite 0, 3,140,252; Zeolite W, 3,008,803; Zeolite Q, 2,991,151; Zeolite M, 2,995,423; Zeolite H, 3,010,789; Zeolite J, 3,001,869; Zeolite W, 3,012,853; Zeolite KG, 3,056,654; Zeolite SL, Dutch 6,710,729; Zeolite Omega, Can. 817,915; Zeolite ZK-5, 3,247,195; Zeolite Beta, 3.308,069; Zeolite ZK-4, 3,314,752; Zeolite ZSM-5, 3,702,886; synthetic mordenite; the so-called ultrastable zeolites of U.S. Pat. Nos. 3,293,192 and 3,449,070; and the references cited therein, incorporated herein by reference. Other synthetic zeolites are described in the book "Zeolite Molecular Sieves-Structure, Chemistry and Use," by Donald W. Breck, 1974, John Wiley & Sons, incorporated by reference herein. Illustrative of the naturally occurring crystalline zeolites are analcime, bikitaite, edingtonite, epistilbite, levynite, dachiardite, erionite, faujasite, analcite, paulingite, noselite, ferrierite, heulandite, scolecite, stilbite, clinoptilolite, harmotone, phillipsite, brewsterite, flakite, datolite, chabazite, gmelinite, cancrinite, leucite, lazurite, scolecite, mesolite, ptilolite, mordenite, nepheline, natrolite, scapolite, thomsonite, gismondine, garronite, gonnardite, heulandite, laumontite, levynite, offretite, yugawaralite. Descriptions of certain naturally occurring zeolites are found in the aforementioned book by Breck, in the book "Molecular Sieves-Principles of Synthesis and Identification", R. Szostak, Van Nostrand Reinhold, New York, 1989, both incorporated by reference herein, and in other known references. These zeolites may be in the hydrogen form or may be partially or fully exchanged with ammonium or metal ions.

As used herein, the term "compound" as applied to alkaline earth metal refers to the combination of alkaline earth metal with one or more elements by chemical and/or physical and/or surface bonding, such as ionic and/or covalent and/or coordinate and/or van der Waals bonding, but specifically excludes that bonding involved between an alkaline earth metal and a zeolite when such alkaline earth metal is located in a cation exchange site of the zeolite. The term "ionic" or "ion" refers to an electrically charged moiety; "cationic" or "cation" being positive and "anionic" or "anion" being negative. The term "oxyanionic" or "oxyanion" refers to a negatively charged moiety containing at least one oxygen atom in combination with another element. An oxyanion is thus an oxygen-containing anion. It is understood that ions do not exist in vacuo, but are found in combination with charge-balancing counter ions. The term "oxidic" refers to a charged or neutral species wherein an element such as an alkaline earth metal is bound to oxygen and possibly one or more different elements by surface and/or chemical bonding. This, an oxidic compound is an oxygen-containing compound, which also may be a mixed, double, or complex surface oxide. Illustrative oxidic compounds include, by way of non-limiting example, oxides (containing only oxygen as the second element), hydroxides, nitrates, sulfates, carboxylates, carbonates, bicarbonates, oxyhalides, etc, as well as surface species wherein the alkaline earth metal is bound directly or indirectly to an oxygen either in the substrate or the surface. "Surface" as applied to zeolites and the instant compositions refers to external surface as well as the internal pore surface, the internal surface being both the surface of the macro pores resulting from the agglomeration of individual particles or crystallites as well as the surface of the mesopores and micropores and supercages that result from the intrinsic zeolite crystal structure. The term "salt" as used in the instant specification and claims is meant to encompass a single salt as well as mixtures of two or more salts. The term "alkaline earth metal" is used herein as a descriptor of the elements of Group IIA of the Periodic Table of the Elements (Be, Mg, Ca, Sr, Ba, Ra). Alkaline earth metal herein does not refer the element in the metallic or zero valent state, but rather is a shorthand use for the element in the positive valent state, that is, it will be understood to be combined as a salt, compound, complex, etc. The term "basic" refers to having the characteristic of a base; e.g., when placed in a solution, a basic material will have a pH consistent with a base rather than an acid and, if a catalyst, will catalyze chemical reactions that are catalyzed by bases.

The alkaline earth metal salts that are suitable for preparing the compositions of the instant invention are any salts that can be dissolved in a suitable impregnating solution or which can be melted to form their own impregnating solution or which can be sublimed and condensed on the zeolite. Illustrative but non-limiting examples of suitable salts are alkaline earth metal chlorates, perchlorates, cyanides, hydroxides, iodates, nitrates, nitrites, sulfates, hydrogen sulfates, sulfites, dithionates, thiosulfates, alkoxides, carboxylates, sulfonates, iodates, halides and the like. Salts which can be solubilized in a suitable solution are preferred. Preferred salts are those which have an oxygen-containing anion or oxyanion or which can be precipitated in situ with an oxyanion. Useful salts are those which decompose at least in part upon calcination in the presence of the zeolite to provide an alkaline earth metal-oxygen-containing moiety (Ca-O-), that is, produce an oxidic compound. When the alkaline earth metal salt is associated with an anion which does not contain oxygen it is necessary that the salt be precipitated in situ with a suitable oxyanion, or alternatively, after impregnation, the subsequent calcination is carried out in an oxygen-containing atmosphere to cause the salt to react with the oxygen to provide the alkaline earth metal-oxygen-containing moiety, that is, produce an alkaline earth metal oxidic compound. Decomposition can be indicated by the evolution of gases such as carbon oxides, nitrogen oxides, sulfur oxides etc. Decomposition can also be indicated by disappearance at least in part of the particular anionic form associated with the alkaline earth metal in the impregnation liquid. For example, when carboxylates and alkoxides are calcined the carboxylate and alkoxide moiety associated with the alkaline earth metal will decompose giving off carbon oxides and/or water and/or hydrocarbons, thereby disappearing at least in part. Particularly preferred salts to be used in an impregnating solution are nitrates and carboxylates. Mixtures of alkaline earth metal salts, that is, two or more salts with differing anions, differing cations or differing anions and cations can be utilized to prepare the impregnated zeolite.

One method that can be used to prepare the compositions of the instant invention involves the use of molten alkaline earth metal salt to impregnate the zeolite. In this method a suitable salt, that is, one melting below about 850° C., is melted and the zeolite is added to the molten salt or the molten salt is added to the zeolite causing the molten salt to impregnate the pores of the zeolite. A very suitable impregnation technique is to utilize that amount of molten salt that is equal to or less than that amount of molten salt that will just fill the pores of the zeolite. Alternatively, zeolite particles can be immersed in a molten salt bath to cause impregnation of the molten salt into the zeolite followed by separation of the excess molten salt from the zeolite, say by filtration, centrifugation or washing. Alternatively, zeolite particles can be coated with finely divided particles of a suitable alkaline earth metal salt and heated to above the melting point of the salt, causing the molten salt to impregnate the pores of the zeolite. After impregnation, the impregnated zeolite is calcined to produce the composition of the instant invention. The calcining temperature may be the same or lower than the impregnating temperature but frequently it is higher. Drying is not required when the molten salt technique is utilized, but may be utilized to remove residual water remaining in the zeolite. The impregnation and calcination can be carried out in one continuous step or sequence. The alkaline earth metal nitrates and carboxylates are particularly suitable for use in the molten impregnation method.

Another method is to use a sublimable alkaline earth metal salt. In this method a suitable salt is sublimed at above its sublimation temperature to produce a vaporous salt and the resulting vapor is contacted with the zeolite maintained at a temperature near or below the sublimation temperature of the salt thereby causing the vapor to condense upon and within the pores of the zeolite thereby impregnating it. Calcination follows to prepare the compositions of the instant invention. Drying before calcination is not required in this case, but may be utilized to remove residual water in the zeolite. The impregnation and calcination can be carried out in one continuous step or sequence.

Most conveniently and preferably, solutions of alkaline earth metal salts are used to impregnate the zeolites. The solvents utilized to dissolve the salts may be organic or inorganic. The only requirement is that the desired salt be soluble in the particular solvent. Hydroxylic solvents are preferred. Water is a particularly preferred solvent. The lower alkanols are also particularly suitable for use with salts having strong basicity in water in order to minimize base-zeolite structure interactions during the impregnation process. Organic solvents are particularly useful as solvents for alkaline earth metal salts which have organic ionic components such as carboxylate, sulfonate, alkoxide, etc. Organic solvents are also useful for inorganic alkaline earth metal salts. Alkaline earth metal salts having a low solubility in an organic solvent can be used with that solvent to provide small, but well controlled amounts of alkaline earth metal to the zeolite while minimizing solvent-base-zeolite structure interactions. Illustrative, but non-limiting examples of organic solvents include alcohols, including polyhydric alcohols, ethers, esters, ketones, amides, sulfoxides and chloro/fluorohydrocarbons such as the various freons. Specific illustrative examples include methanol, ethanol, glycol, dimethyl ether, methyl acetate, methylethyl ketone, dimethyl formamide ("DMF"), dimethyl sulfoxide ("DMSO"), N-methyl pyrrolidone ("NMP"), hexamethylphosphoramide ("HMPA"), dichlorodifluoromethane, methyl chloride, ethylene dichloride, ethylene carbonate, etc. Illustrative, but non-limiting examples of inorganic solvents include water, liquid ammonia, liquid carbon dioxide, liquid sulfur dioxide, carbon disulfide, carbon tetrachloride, etc. Mixtures of solvents which are mutually miscible may be utilized.

A preferred variation on the impregnation technique comprises impregnating the zeolite with a soluble salt of an alkaline earth metal salt, followed by contact or reimpregnation with a precipitating agent, such as a suitable solubilized anion, that will form a precipitate in situ with alkaline earth metal ion. Preferred soluble salts include acetates, halides, chlorates, nitrites and nitrates. For example, a zeolite is first impregnated with an aqueous solution of barium or calcium nitrate or chloride. Then the impregnated zeolite, without or without intermediate drying and/or calcining is contacted with an aqueous solution of ammonium or alkali metal sulfate or hydroxide, or carbonic acid causing barium or calcium sulfate, hydroxide, or carbonate to precipitate within the zeolite. This resultant material is then dried as necessary and optionally calcined. Gaseous precipitating agents may also be utilized. For example, after a zeolite is first impregnated with an aqueous solution of alkaline earth metal nitrate, it is then contacted without intermediate drying with, for example, gaseous carbon dioxide, sulfur trioxide, ammonia or dimethylamine, resulting in the precipitation of the alkaline earth metal carbonate, sulfate or hydroxide. Preferred precipitating agents are those which produce an oxidic compound or a compound which is converted to an oxidic compound upon calcination, such as solutions of alkali metal or ammonium sulfate, hydroxide or carbonate; or sulfuric acid or carbonic acid.

Single or multiple impregnations may be used. When multiple impregnations are used intermediate drying steps, optionally followed by precipitation and/or calcination may be utilized. Generally any amount of impregnating liquid can be used in the impregnation process. For example, the zeolite can be dipped into a large excess (compared to the pore volume of the zeolite), removed and shaken of excess liquid. Alternatively, an amount of impregnating liquid considerably less than the pore volume can be sprayed onto an agitated bed of zeolite. For purposes of economy, control and other reasons, the volume of impregnating liquid will preferably range from about the pore volume to about four or five times, preferably about twice the pore volume of the zeolite to be impregnated. Alternatively, a "dry" impregnation technique is utilized wherein just that amount of impregnating solution is used which will just fill the pores of the zeolite. In another embodiment, baskets of zeolite material are dipped into a vat of impregnating solution, removed, dried and optionally calcined. Alternatively, the zeolite may be tumbled with the impregnation solution.

The concentration of alkaline earth metal salts in the impregnating solution is not critical and is selected, inter alia, on the basis of the zeolite used, the amount of ion exchange capacity present in the zeolite, the degree of basicity of the final product desired, the impregnation solvent used and the type of impregnation utilized, that is, multiple or single. Concentrations of alkaline earth metal salt(s) in the impregnating solution will typically range from about 0.01 moles per liter to the solubility limit of the salt(s). A suitable range is from about 0.01 to about 20 moles per liter, more preferably from about 0.1 to about 10 moles per liter.

The amount of alkaline earth metal which is impregnated into the zeolite must be in excess of that which would provide a fully cation-ion exchanged zeolite. For example, if the starting zeolite were completely in the hydrogen form and had an ion exchange capacity of 12% (basis $Na_2O$), then the amount of alkaline earth metal impregnated (basis $Na_2O$) must exceed the 12%. If the starting zeolite were one which had already been 80% exchanged with a metal cation, the amount of alkaline earth metal to be added by impregnation would be in excess of that amount required to exchange the remaining 20%. If the starting zeolite were fully metal cation exchanged, then any amount of alkaline earth metal in the impregnating solution would suffice. It is to be understood that impregnation of a partially or fully cation-exchanged zeolite will most likely result in some counter ion exchange between the impregnating alkaline earth metal cation(s) and the cations already present in the zeolite, but the resulting composition will still be within the scope of the instant invention in having an excess of alkaline earth metal present over the amount required for a fully exchanged zeolite. When the amount of impregnating solution that is utilized is such that after impregnation no excess solution is removed, then the amount of alkaline earth metal salt in the impregnating solution will be the same as the amount impregnated into the zeolite. When an amount of impregnating solution is used that requires that an excess amount of solution must be removed, for example, by filtration or centrifugation, from the impregnated zeolite after impregnation, then the amount of alkaline earth metal in the impregnating solution will exceed the amount of alkaline earth metal impregnated into the zeolite. In this latter case, the amount of alkaline earth metal impregnated into the zeolite can be determined by a knowledge of concentration of alkaline earth metal in the impregnating solution before the impregnation, the concentration of alkaline earth metal in the excess solution removed from the impregnated zeolite and the amount of solution remaining after impregnation (the excess). Alternatively, the impregnated zeolite can be analyzed for alkaline earth metal content.

The compositions of the instant invention which comprise a zeolite and an alkaline earth metal compound can be divided into four somewhat arbitrary classes, depending on the amount of alkaline earth metal compound that is present in the composition. In order of increasing basicity, there are low base, low-intermediate base, high-intermediate base and high base compositions. The higher the basicity of the instant compositions, the higher will be the suppression of any acid function of the zeolite. The calculations of the ranges and limits for these various classes are to be made considering the alkaline earth metal as the metal (ion) and any metal(s) exchanged into the zeolite as the (ionic) equivalent of an alkaline earth metal.

When considering as a basis for calculation the zeolite having no cations exchanged therein, the low base compositions will have the sum of the alkaline earth metal in the alkaline earth metal compound and any metal cation exchanged into the zeolite ranging from greater than to about 1.2 times the amount required to provide a fully cation-exchanged zeolite (or times the exchange capacity). When considering the fully cation-exchanged zeolite as a basis for calculation, the amount of alkaline earth metal in the alkaline earth metal compound is greater than to about 0.2 times the amount of alkaline earth metal that would be required to provide a fully metal cation-exchanged zeolite (or times the exchange capacity).

When considering as a basis for calculation the zeolite having no cations exchanged therein, the low-intermediate base compositions will have the sum of the alkaline earth metal in the alkaline earth metal compound and any metal cation exchanged into the zeolite ranging from about 1.2 to about 1.5 times the amount required to provide a fully cation-exchanged zeolite (or times the exchange capacity). When considering the fully cation-exchanged zeolite as a basis for calculation, the amount of alkaline earth metal in the alkaline earth metal compound ranges from about 0.2 to about 0.5 times the amount of alkaline earth metal that would be required to provide a fully metal cation-exchanged zeolite (or times the exchange capacity).

When considering as a basis for calculation the zeolite having no cations exchanged therein, the high-intermediate base compositions will have the sum of the alkaline earth metal in the alkaline earth metal compound and any metal cation exchanged into the zeolite ranging from about 1.5 to about 2 times the amount required to provide a fully cation-exchanged zeolite (or times the exchange capacity). When considering the fully cation-exchanged zeolite as a basis for calculation, the amount of alkaline earth metal in the alkaline earth metal compound ranges from 0.5 to about 1 times the amount of alkaline earth metal that would be required to provide a fully metal cation-exchanged zeolite (or times the exchange capacity).

When considering as a basis for calculation the zeolite having no cations exchanged therein, the high base compositions will have the sum of the alkaline earth metal in the alkaline earth metal compound and any metal cation exchanged into the zeolite ranging from about 2 times the amount required to provide a fully cation-exchanged zeolite (or times the exchange capacity) to the limit of alkaline earth metal compound that can be physically impregnated into the zeolite, which in a preferred embodiment is about 3.5 times the amount required to provide a fully cation-exchanged zeolite (or times the exchange capacity). When considering the fully cation-exchanged zeolite as a basis for calculation, the amount of alkaline earth metal in the alkaline earth metal compound ranges from about 1 times the amount of alkaline earth metal that would be required to provide a fully metal cation-exchanged zeolite (or times the exchange capacity) to the limit of alkaline earth metal compound that can be physically impregnated into the zeolite, which in a preferred embodiment is about 2.5 times the amount required to provide a fully cation-exchanged zeolite (or times the exchange capacity).

In general it is preferred to have a slight excess of alkaline earth metal present. When considering as a basis for calculation the zeolite having no cations exchanged therein, the preferred compositions will have the sum of the alkaline earth metal in the alkaline earth metal compound and any metal cation exchanged into the zeolite being greater than 1, preferably greater than about 1.05, more preferably greater than about 1.1, even more preferably greater than about 1.15, even more preferably greater than about 1.2, even more preferably greater than about 1.5, even more preferably greater than about greater than about 2 times the amount required to provide a fully cation-exchanged zeolite (or times the exchange capacity). When considering the fully cation-exchanged zeolite as a basis for calculation, the amount of alkaline earth metal in the alkaline earth metal compound is greater than zero, preferably greater than about 0.05, more preferably greater than about 0.1, even more preferably greater than about 0.15, even more preferably greater than about 0.2, even more preferably greater than about 0.5, and even more preferably greater than about 1 times the amount of alkaline earth metal that would be required to provide a fully metal cation-exchanged zeolite (or times the exchange capacity). However, limits may be placed on the amount of alkaline earth preferred depending on physical constraints of the zeolite, such as remaining pore volume, end uses contemplated for the basified zeolite and other considerations.

When considered in terms of those cases where increasing basicity is desired, and when considered in terms of the non-cation exchanged zeolite as a basis for calculation, the sum of alkaline earth in the alkaline earth metal compound and any metal cation exchanged into the zeolite is greater than about 1.2, more preferably greater than about 1.5 and even more preferably greater than about 2 times the amount required to provide a fully cation-exchanged zeolite (or times the exchange capacity). When considering the fully cation-exchanged zeolite, the amount of alkaline earth metal in the alkaline earth metal compound is greater than about 0.2, more preferably greater than about 0.5, and even more preferably greater than 1 times the amount of alkaline earth metal that would be required to provide a fully metal cation-exchanged zeolite.

After impregnation utilizing an impregnating solution or a subsequent precipitating solution, the impregnated zeolite is dried to remove the solvent of the impregnating and/or precipitating solution. The drying conditions are not critical to the instant invention. Drying may be carried out at atmospheric pressure, superatmospheric pressure or under vacuum. It also may be carried out by passing a dry (with regard to the impregnating solvent) gas over a bed of the zeolite. Drying temperatures will depend upon the solvent used. For those solvents that are liquid at low temperatures, such as liquid carbon dioxide or liquid sulfur dioxide, the drying temperature can be relatively low, that is, below room temperature. For the more conventional solvents which are liquid at or above room temperature, higher temperatures will be used. For these solvents temperatures will typically range from about room temperature to about 200° C. In most cases drying temperatures will be less than about 200° C., preferably less than 150° C. Drying times are dependent upon the drying temperature and pressure, typically from about one minute to about twenty hours, although longer or shorter times can be utilized. Drying atmospheres and pressures are normally not critical. The drying atmosphere may be neutral, oxidizing, reducing or a vacuum.

After drying to remove an impregnating solvent or after impregnation by means of a molten or vaporous salt, the impregnated zeolite is optionally calcined at elevated temperatures. Calcination conditions will range from about 150° C. to about 850° C., preferably from about 200° C. to about 750° C., and more preferably from about 200° C. to about 600° C. Calcining times are dependent on the calcining conditions selected and typically range from about one minute to about twenty hours, although longer or shorter times can be utilized. Calcining conditions and times are also adjusted according to the thermal stability. Calcination conditions should not be so extreme as to cause extreme loss of zeolite crystallinity. Calcining atmospheres may be neutral, oxidizing or reducing. When the impregnating salt has an anionic component which does not contain oxygen, an oxygen-containing calcining atmosphere is preferably utilized. When the calcined composition is a catalyst or a catalyst support, particular calcining atmospheres may be called for. For example, when certain catalytic metals need to be present in the reduced state, a reducing atmosphere is utilized. Barring special circumstances, neutral atmospheres such as provided by nitrogen and oxidizing atmospheres such as provided by air are preferred.

In a preferred embodiment when using an impregnation or an impregnating/precipitating solution, the drying and calcining steps are combined into one integrated process step. In this combined step the impregnated zeolite is heated through the lower temperatures at a rate slow enough that physical disruption of the zeolite does not occur due to rapid volatilization of the solvent from the impregnation. After the solvent has been removed, the zeolite is then heated to the desired calcining temperature, maintained for the desired calcining time and then cooled to room temperature. When the instant compositions are used as catalysts, calcination may be carrier out in situ in a reactor.

The exact form of the alkaline earth metal after calcination in the instant compositions is not known. Without intending to limit the scope of the instant invention, it is believed that the alkaline earth metal(s) is present as one or more alkaline earth metal oxidic compounds. It is speculated that the alkaline earth metal compound(s) are probably in the form of a surface oxide or multiple surface oxides with the zeolite, in particular with the aluminum and/or silicon and/or oxygen of the zeolite lattice, possible in combination with species contained in or formed from the impregnation solution or during the calcination process.

The calcination contributes to the production of a composition which is basic and this basic nature is thought to derive from the particular nature of the alkaline earth metal compound present after calcination. However, those compositions produced by precipitation with a basic precipitating agent are within the scope of the instant invention, even without calcination taking place. The basic nature of these materials can be seen from the fact that instant compositions when placed in a solvent produce effects that are basic rather than acidic in nature. This can been seen by the use of suitable chemical or electrochemical indicators. The basic nature of the instant compositions can also be seen from the fact that they will catalyze or carry out chemical reactions that are catalyzed or carried out by bases. For example, the dehydrochlorination of chlorohydrocarbons such as 1-chlorooctane, are well known to be carried out by bases and the instant compositions also carry out this reaction.

The basicity of the instant compositions can be determined in various ways. For example, it can be determined by measuring the extent to which various base-catalyzed reactions are carried out in the presence of the instant compositions. Another method is to place the instant composition in a solvent and measure the resulting pH by use of chemical or electrochemical indicators. A specific example would involve placing 20 mg of composition in 2 g of water and using a pH meter or pH paper to measure the resulting pH. Another method is to use various indicators in non-aqueous solutions and compare the indicator response caused by the instant compositions with the indicator response caused by selected reference samples. Generally, suitable indicators are 4-nitroaniline or 4-chloroaniline dissolved in dimethyl sulfoxide ("DMSO") or benzene (@ 0.1 g/cc). These indicators, however, may have too large a molecular cross-section to be used with the very small pore zeolites, and other indicators or methods of determining basicity would have to be used. Examples of indicator responses with various reference samples is shown in Table 1 below.

TABLE 1

| Reference | 4-nitroaniline/DMSO | 4-chloroaniline/benzene |
|---|---|---|
| NaNH$_2$ | very dark blue | purplish brown |
| KOH | dark blue | cream |
| NaY-Zeolite | yellow | cream |
| amorphorous SiO$_2$ | faint yellow | cream |

In general terms the compositions of the instant invention comprise a basic, structured, that is a zeolitically structured, alkaline earth metal-containing aluminosilicate containing in compound form an excess of alkaline earth metal over that necessary to provide a fully metal cation-exchanged aluminosilicate. More specifically, the instant compositions comprise a zeolite and an alkaline earth metal compound, particularly an oxidic compound, wherein the sum of the amount of the alkaline earth metal in the compound plus any metal cation exchanged into the zeolite is in excess of that required to provide a fully metal cation-exchanged zeolite. The instant compositions will contain at least a portion of their pore volume in micropores in the range of from about four to about twelve angstroms. The instant compositions react as bases when placed in solvents and catalyze base-catalyzed reactions. In a preferred embodiment for shape selective catalysis, the alkaline earth metal compound is substantially located on the internal pore surfaces of the zeolite rather than the external surfaces.

The instant compositions retain at least a portion of a crystalline zeolite structure. The term "crystalline" is employed herein to designate an ordered structure capable of being detected by electrooptical or diffraction techniques, normally by X-ray diffraction, giving a consistent crystallographic pattern. Such an ordered structure can persist even after some of the structural silica or alumina is removed from the crystal lattice, as by leaching with acids, or with bases such as might occur during the impregnation process, or by other physical or chemical methods. Sometimes the ordered structure may become so attenuated by these or other means as to fail to diffract X-rays, but in such cases other electrooptical methods, such as electron beam diffraction may be utilized. In other cases the crystallite size may become so small that diffraction effects may become so diffuse that the amount of crystalline structure may be difficult to detect or determine. In this latter instance, however, the retention of a large surface area after chemical and/or physical processing will indicate the retention of a certain amount crystalline zeolite structure. Thus these latter materials are still structured aluminosilicates as opposed to amorphous aluminosilicates and are within the scope of the instant invention.

The compositions of the instant invention find many uses. They are useful as adsorbents. They can be used, for example, to adsorb acidic gases or vapors from a vapor phase, or to adsorb acidic species from a liquid phase.

The instant compositions can also serve as catalysts or catalyst supports for other catalytic components. Catalytic components may be incorporated into the instant compositions at any stage of their preparation, that is, prior to, during and after the conversion of the starting zeolite to final basic composition. Large numbers of materials can be added to the compositions of the instant invention in order to make catalysts. Illustrative but non-limiting examples include the transition metals (atomic nos. 21-29, 39-47, 72-79); Group IIB metals (atomic nos. 30, 48, 80); Group IIIA metals (atomic nos. 5, 13, 31, 49, 81); Group IVA metals (atomic nos. 14, 32, 50, 82), Group VA metals (atomic nos. 15, 33, 51, 83); Group VIA metals (atomic nos. 34, 52); the lanthanide metals (atomic nos. 57-71), as well as their oxides, sulfides, halides, salts, complexes, compounds and the like. The alkali metals (atomic nos. 3, 11, 19, 37, 55, 87) may also be present in the compositions of the instant invention. These additional components present in the instant compositions may be added at any stage of the preparation of the instant compositions. For example, they may be present in the starting zeolite, or added during the preparative process, or added to already prepared compositions.

Illustrative but non-limiting examples of organic chemical reactions for which the instant compositions will find use as catalysts include double bond isomerization, dehydrogenation, cyclization of polyenes, H-D exchange, condensation, side chain alkylation of alkyl benzenes, olefin dimerization, olefin oligomerization, dehydrohalogenation, cleavage coupled with oxidation, oxidation, reduction/elimination, nucleophilic addition, etc.

Illustrative but non-limiting examples of organic chemical reactions for which the instant compositions when combined with other catalytic components will find use are illustrated in Table 2 below.

TABLE 2

| Catalytic Component | Reaction |
| --- | --- |
| Sc | C—H activation |
| V | oxidation |
| Cr | oxidation, coupling, cyclization, reductive cleavage |
| Mn | oxidation |
| Fe | oxidation, olefin isomerization, cyclization, reduction, halogenation |
| Co | oxidation, hydroformylation, hydrogenation, olefin isomerization, dimerization |
| Ni | hydrogenation, oligomerization, isomerization, carbonylation, dimerization, coupling, cyclization |
| Cu | oxidation, hydrogenation, coupling, cyclization, decarboxylation, cyanoethylation, halogenation |
| Y | oxidation, C—H activation |
| Nb | oxidation, olefin isomerization |
| Mo | oxidation, olefin isomerization |
| Ru, Rh, Pd | CO activation, oxidation, amination, hydrogenation, olefin isomerization, isomerization, cyclization |
| Ag | oxidation, hydrogenation, rearrangement, hydroxylation |
| La—Lu | oxidation, condensation, amination, dehydrogenation, oligomerization |
| Re | oxidation, hydration |
| Os | oxidation, epoxidation, hydrogenation |
| Pt | C—H activation, hydrogenation, CO activation, isomerization |
| Bi | oxidation, suppression of dehydrogenation |
| Th, U | CO activation, oxidation |
| W | oxidation, activation, olefin metathesis |
| Sb | combustion suppression |
| Sn | weak acid binding site, reduction |
| Ir | hydrogenation, olefin isomerization |
| Hg | hydrogenation, oxidation, hydration, halogenation |
| Pb | oxidation, coupling, cyclization, decarboxylation, cleavage |
| Ti | oxidation, dimerization, rearrangements, isomerization |
| Tl | oxidation |
| Zn | ether cleavage |
| Zr | alkylation |

When catalytic components are added to the instant compositions numerous factors will be considered by one skilled in the art when preparing the combination of catalytic components and instant compositions. Non-limiting examples of these factors include pore structure; ease of activation; number of base sites; location and type of catalytic components; stability of the catalyst (temporal, thermal, hydrolytic, etc.); polarity (ionization ability) of zeolitic pore/cage; binding affinity (lipophilicity or hydrophilicity) of zeolitic pore/cage; use of promoters or activators to modify catalytic effects; shape selectivity; presence or absence of dual channel network; etc.

The compositions of the instant invention, alone or in combination with other catalytic components, may be distributed throughout an inert inorganic diluent which also may serve as a binder. Non-limiting examples of such diluents include aluminas, silicas, silica-aluminas, charcoal, pumice, magnesia, zirconia, keiselguhr, fullers' earth, silicon carbide, clays and other ceramics. In a preferred use of binders the instant zeolitic compositions are intimately mixed a finely divided, hydrous, refractory oxide of a difficulty reducible metal. The term "hydrous" is used to designate oxides having structural surface hydroxyl groups detectable by infrared analysis. The preferred oxides are alumina, silica, magnesia, beryllia, zirconia, titania, thoria, chromia, and combinations thereof such silica-alumina, silica-magnesia, and the like. Naturally occurring clays comprising silica and alumina may also be utilized, preferably after acid treatment. The metal oxide can be combined with the instant compositions as a hydrous sol or gel, an an anhydrous activated gel, a spray dried powder or a calcined powder. In one modification a sol or solution of the metal oxide precursor, such as an alkali or alkaline earth metal silicate or aluminate can be precipitated to form a gel in the presence of the compositions of the instant invention. When less hydrous forms of the metal oxide are combined with the instant compositions, essentially any method of effecting intimate admixture of the components may by utilized. One such method is mechanical admixture, e.g., mulling, which involves admixing the instant compositions in the form of a powder with the slightly hydrous, finely divided form of the metal oxide. The diluent or binder may be added to the instant compositions at any point in their preparation, that is, before, during or after impregnation, drying and/or calcination.

The instant compositions may also be further activated by the incorporation into the zeolite of additional alkali metal compounds or salts, followed by calcination. For example a composition of the instant invention may be impregnated by an aqueous solution of an alkali metal carbonate, dried and calcined to provide an enhanced basic catalyst.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The following illustrative embodiments are provided for illustration and are not to be construed as limiting the invention.

ILLUSTRATIVE EMBODIMENTS

The following illustrative embodiments, which are also summarized in Table 3, are grouped according to typical Example types, described below. Table 3 also provides selected reference materials and comparative examples along with certain physical properties and basicity test results. Table 3 also provides data relative to compositions prepared similar to examples A through M along with the variations used in starting zeolites, impregnating solutions, impregnating salts, impregnating conditions, resulting selected properties and basicity test results. It is apparent that many variations and extensions of these examples may be performed by one skilled in the art to achieve results within the scope of the instant invention. These examples are provided only to illustrate the invention, not to limit it.

EXAMPLE A 10.17 g Davison 5A zeolite (8–12 mesh beads) was impregnated with 4.57 g barium acetate (Alfa) dissolved in 6.94 cc of Barnstead deionized water. Four impregnations were necessary. After each impregnation the zeolite was rotated in a round bottom flask on a rotary evaporator (rotation only). After the second rotation, the zeolite was dried in a 100° C. vacuum oven. The zeolite was dried in a 60° C. vacuum oven after the third rotation. After the fourth impregnation, 16.33 g of the zeolite was placed in fritted glassware and 19.4 g of anhydrous ammonia was bubbled up through the beads. These zeolite beads were transferred to an erlenmeyer flask and washed with two 20 cc portions of lime water, vacuum filtering after each wash. Then the zeolite was dried for 2.5 days in a 100° C. vacuum oven. The zeolite beads were placed in a vycor tube in an upright furnace. With nitrogen flowing over the beads, the temperature was raised to 450° C. and held for 2 hours. After cooling, the tube was sent into the dry box for bottling and storage.

EXAMPLE B

In a dish, 50.02 g Baylith CP-190 NaY zeolite was impregnated with 23.65 g magnesium nitrate hexahydrate (Aldrich) dissolved in 55 cc water. The impregnation was done in two steps, with drying for 1 hr in a 100° C. vacuum oven between steps, followed by a final drying at 100° C. for about 16 hrs. The dried material was placed in a vycor tube in an upright furnace and heated to 550° C. for 1 hr under flowing nitrogen. The heater was turned off and allowed to cool with nitrogen still flowing. A cold trap and an ascarite trap were placed in the exiting nitrogen line during the procedure and 6.65 g water and 0.13 g "$CO_2$" were trapped.

EXAMPLE C1

30.73 g K-L zeolite was washed with 300 cc Barnstead deionized water, then filtered. 200 cc more water was poured through the funnel. The material was then dried for 1 hr in a 150° C. vacuum oven.

2.00 g of the washed and dried K-L was impregnated with 0.93 g Magnesium acetate (MCB reagent) dissolved in 1.51 g Barnstead water. Two impregnations were necessary. After the first, the material was allowed to sit for 38 minutes, and then dried 17.5 hrs in a 150° C. vacuum oven. After the second, the material was allowed to sit about 30 minutes, then dried for 63 minutes in a 150° C. vacuum oven. The dried material was then placed in a vycor tube in an upright furnace and heated to 200° C. with nitrogen flowing over the material. After 25 minutes, the temperature was raised to 550° C., where it was held for 2 hrs. After cooling the tube was sent into the dry box for bottling and storage.

EXAMPLE C2

1.36 g $NH_4$+Ferrierite (Engelhard Lot #15264-18) was impregnated with 0.61 g Magnesium acetate tetrahydrate (MCB reagent) dissolved in 0.99 cc water (barnstead deionized). After sitting for 10 minutes, the zeolite was dried for about 17.5 hours in a 150° C. vacuum oven. The dried zeolite was placed in a vycor tube in an upright furnace and was heated to 200° C. under flowing nitrogen. After 25 minutes, the temperature was raised to 550° C. and held for 2 hrs. The cooled tube was sent into the dry box for bottling and storage.

EXAMPLE D 4.00 g 5A zeolite (Davison 8–12 mesh) was impregnated with 1.47 g strontium acetate (ICN) dissolved in 4 cc Barnstead water. After sitting for 1 hr, the zeolite was dried for 2.5 hrs in a 150° C. vacuum oven. The dried material was impregnated with 1.6 cc 10N $NH_4OH$, then washed with a mixture of 0.5 cc 10N $NH_4OH$ in 5 cc water, and filtered. The filtered zeolite was dried for 1 hr 25 minutes in a 150° C. vacuum oven, then placed in a vycor tube in an upright furnace, where it was heated to 400° C. under flowing nitrogen. After 2 hrs, the heater was turned off and the tube allowed to cool. The cooled tube was sent into the dry box for bottling and storage.

EXAMPLE E

LZY 82 powder (Union Carbide) was pressed for 2 minutes at 20000 psi in an isostatic press, then ground and sieved to give a 16–30 mesh powder. This sieved LZY 82 powder was placed in a vycor tube in an upright furnace and heated to 550° C. under flowing nitrogen. After 2.3 hrs, the heater was turned off and the tube allowed to cool, still under flowing nitrogen. The material was stored in the dry box. 4.03 g of dried LZY 82 was impregnated with 2.40 g magnesium acetate tetrahydrate dissolved in 2.23 cc water. After drying for 1 hr in a 150° C. vacuum oven, 1.5 cc water (Barnstead) was added before the zeolite was returned to the 150° C. vacuum oven for another 2.25 hrs. The water addition was repeated two more times, with the final drying being 17.5 hrs in a 150° C. vacuum oven. The zeolite was then impregnated with 1.6 cc 10N $NH_4OH$, followed by a wash with 0.5 cc $NH_4OH$ in 5 cc water, followed by filtering. The filtered material was dried for 3 hrs in a 150° C. vacuum oven, then placed in a vycor tube in an upright furnace. The furnace was heated to 200° C. under flowing nitrogen. After 25 minutes, the temperature was raised to 550° C. After 2 hrs, the furnace was turned off and the tube allowed to cool under flowing nitrogen. The material was bottled and stored in the dry box.

EXAMPLE F 4.00 g Na mordenite was impregnated with 0.67 g magnesium acetate tetrahydrate dissolved in 0.33 cc water and allowed to sit 30 minutes before being dried 55 minutes in a 150° C. vacuum oven. 1 cc water was added to the dried zeolite. After mixing, the zeolite was allowed to sit ½ hr before being dried 1 hr in a 150° C. in a vacuum oven. The dried material was placed in a vycor tube in an upright furnace. The furnace was heated to 200° C. under flowing nitrogen. After 15 minutes the temperature was raised to 550° C. and held for 2 hrs. Upon cooling, the tube was sent into the dry box for bottling and storage.

EXAMPLE G

In a vial 0.11 g Chabazite (dried 1 hr in a 150° C. vacuum oven) was impregnated with 0.01 g calcium acetate dissolved in 0.03 cc water. The chabazite was allowed to sit 13 minutes before being dried 1.2 hrs in a 150° C. vacuum oven. The dried material was placed in a vycor tube in an upright furnace and was heated to 200° C. under flowing nitrogen. After 20 minutes, the temperature was raised to 550° C. After 2 hrs, the furnace was turned off and allowed to cool. The tube was sent into the drybox for bottling and storage.

EXAMPLE H 48.23 g 16–30 mesh Na mordenite was placed into a fritted funnel and washed with 150 cc Barnstead deionized water and then vacuum filtered. This washing was repeated three more times. The washed material was placed in a dish and dried 35 minutes in a 150° C. vacuum oven.

In a vial, 4.00 g washed Na mordenite was impregnated with 0.26 g calcium acetate dissolved in 0.74 cc Barnstead water. After sitting for 30 minutes, the zeolite was dried 1 hr in a 150C vacuum oven. 1 cc water was added and the vial was laid on its side. After 30 minutes, it was dried 1 hr in a 150° C. vacuum oven. The dried material was placed in a vycor tube in an upright furnace and was heated to 200° C. under flowing nitrogen. After 24 minutes, the temperature was raised to 550° C. and held for 2 hrs. After cooling, the tube was sent into the drybox for bottling and storage.

EXAMPLE I 4.03 g dried LZY 82 (2 hrs in a 150° C. vacuum oven) was stirred with 40 cc 2M calcium acetate solution for 1 hr after which time it was filtered, and then dried overnight in a 150° C. vacuum oven. Then it was stirred with an additional 40 cc 2M calcium acetate solution for 1 hour, then filtered and washed with two 50 cc portions of Barnstead water. A fresh portion of 2M calcium acetate was added, followed by stirring, filtering and 2 water washes. This material was dried overnight in a 150° C. vacuum oven.

EXAMPLE J 209 g NaY (Baylith CP-190) was stirred with 2 liters Barnstead water for 2 hrs and then filtered. An additional 1.4 liters of water was poured through the filter funnel. The material in the filter was dried overnight in a 150° C. vacuum oven.

In a dish, 15.03 g washed NaY was impregnated with 5.14 g calcium acetate hydrate (Aldrich) dissolved in 15 cc Barnstead water. After sitting 27 minutes, the material was dried 1 hr in a 150° C. vacuum oven. The dried material was impregnated with 6 cc 10N $NH_4OH$ (Aldrich) and allowed to sit 45 minutes before being washed with a solution of 2 cc 10N $NH_4OH$ in 20 cc Barnstead water. After filtering, the material was dried 1 hr in a 150° C. vacuum oven. The dried material was placed in a vycor tube in an upright furnace and was heated to 200° C. under flowing nitrogen. After 27 minutes, the temperature was raised to 550° C. and held for 2 hrs before the heaters were turned off. The cooled tube was sent into the drybox for bottling and storage.

EXAMPLE K 50.04 g NaY (Baylith CP-190) was impregnated with 20.5 g Calcium nitrate dissolved in 8.5 cc water. The impregnation was done in a round bottom flask which was tumbled on a rotary evaporator. After about 1 hr, a solution of 15.2 g potassium carbonate dissolved in 10.8 cc water was added to the round bottom flask. This was tumbled for 1 hr. The water bath was then heated to 60° C. After 1 hr, the round bottom was removed from the heat and 100 cc lime water was added and then the zeolite filtered and the liquid poured back through the funnel. This lime water wash was repeated 3 more times. Then the material was dried over the weekend in a 100° C. vacuum oven. Half of the dried material was placed in a metal tube in an upright furnace and heated to 550° C. under flowing nitrogen. After 97 minutes the furnace was cooled, the tube was removed and the material bottled. The other half of the dried material was placed in a quartz tube and placed in an upright furnace and heated to 700° C. under flowing nitrogen. After 4.5 hrs, the furnace was cooled, the tube removed, and the material bottled.

EXAMPLE L

In a vial, 3.32 g dried LZY 82 pellets (2.5 hrs in 160° C. vacuum oven) was impregnated with 3.10 g magnesium acetate tetrahydrate dissolved in 2.5 cc Barnstead water. The impregnation was done in three steps with heating for 30 minutes in a 150° C. vacuum oven between steps, and after the final step, 1 cc water was added to the dried material. After sitting for 54 minutes, it was dried 1 hr in a 150° C. vacuum oven. An additional 1 cc water was added and after sitting 37 minutes, the material was dried overnight in a 150° C. vacuum oven. The dried material was placed in a vycor tube in an upright furnace and heated to 200° C. under flowing nitrogen. After 25 minutes the temperature was raised to 550° C. After 2 hrs, the furnace was turned off and allowed to cool. The cooled tube was bottled and stored in the dry box.

EXAMPLE M

In a vial, 2.60 g NH4+USY (CB 86-133) was impregnated with 2.44 g magnesium acetate tetrahydrate dissolved in 1.96 cc Barnstead water. The impregnation was done in two steps, with drying for 30 minutes at 150° C. between steps and 1 hr drying after the last step. The dried material was placed in a vycor tube in an upright furnace and heated to 200° C. under flowing nitrogen. After 23 minutes, the temperature was raised to 550° C. and held for 2 hrs. The cooled tube was sent into the dry box for bottling and storage.

EXAMPLE N 4.02 g dried NH4+mordenite (2 hrs in a 150° C. vacuum oven with a slow nitrogen bleed) was slurried with 40 cc 2M magnesium acetate for 2 hrs, and then filtered and washed with two 50 cc portions Barnstead water. The filtered material was dried 1 hr in a 150° C. vacuum oven. Then slurring with 2M magnesium acetate and washing with water was repeated three more times. The material was then dried 1 hr in a 150° C. vacuum oven.

In a vial 1.00 g of the Mg mordenite was impregnated with 0.33 cc of a solution of 1 g magnesium acetate tetrahydrate in 1.4 cc methanol. After sitting for 42 minutes, the material was dried overnight in a 150° C. vacuum oven. The dried material was placed in a vycor tube in an upright furnace and heated to 200° C. under flowing nitrogen. After 25 minutes, the temperature was raised to 550° C. and held for 2 hrs. The cooled tube was sent into the drybox for bottling and storage.

EXAMPLE O

In a vial 2.05 g 5A zeolite was impregnated with 0.6 cc of a solution of 1.02 g magnesium acetate tetrahydrate dissolved in 1.8 cc dimethylsulfoxide. The material was dried 1.25 hrs in a 150° C. vacuum oven and then placed in a vycor tube in an upright furnace and heated to 200° C. under flowing nitrogen. After 29 minutes, the temperature was raised to 550° C. and held for 2 hrs. Upon cooling, the tube was sent into the drybox for bottling and storage.

EXAMPLE P

A mixture of 21.36 g ground 5A zeolite and 2.24 g calcium butyrate was added to a vycor tube in an upright furnace and slowly heated to 550° C. under flowing nitrogen. After 1 hr at 550° C., the furnace was cooled, and the cooled tube was sent into the dry box for bottling and storage.

EXAMPLE Q

In a vial, 1.00 g CaLZY82 (preparation described in Example I) was impregnated with 0.47 g magnesium acetate tetrahydrate dissolved in 0.75 cc Barnstead water. The impregnation took place in two steps. After the first step, the material sat 2.33 hrs, and then was dried overnight in a 150° C. vacuum oven. After the second step, the material sat 10 minutes before being dried 2.2 hrs in a 150° C. vacuum oven with a slow nitrogen bleed. The dried material was placed in a vycor tube in an upright furnace and heated to 200° C. under flowing nitrogen. After 15 minutes, the temperature was raised to 550° C. and held 2 hrs. The cooled material was bottled and stored in the dry box.

EXAMPLE R

In a vial, 2.53 g dried NH4+mordenite (dried 2 hrs in a 150° C. vacuum oven) was impregnated with 1.18 g magnesium acetate tetrahydrate dissolved in 1.9 cc water. After sitting 22 minutes, the material was dried overnight in a 150° C. vacuum oven. The dried material was placed in a vycor tube in an upright furnace and heated to 200° C. under flowing nitrogen. After 25 minutes, the temperature was raised to 550° C. and held for 2 hrs. The cooled tube was sent into the dry box for bottling and storage.

Table 3 illustrates some typical results obtained by practicing the invention on the manner set forth in the above examples. Many related preparations have been prepared, with similar results.

TABLE 3

| Description CATALYST System Designation (Salt/Zeolite) | ILLUSTRATIVE EMBODIMENTS | | | | | | | | |
|---|---|---|---|---|---|---|---|---|---|
| | Part A | | | | | | | | |
| | Materials used | | | | Conditions | | | Structure | |
| | | | | | | | | XRD | |
| | Solvent | Solv. Wt. | Salt Wt. | Zeol. Wt. | Temp.$^a$ | Method$^b$ | Example$^c$ | % xtal$^d$ | S.A. sq. m./g$^e$ |
| REFERENCE MATERIALS: | | | | | | | | | |
| KOH pellets | — | — | — | — | — | — | — | — | — |
| Shell Silica Spheres | — | — | — | — | — | — | — | — | — |
| Sodium Amide | — | — | — | — | — | — | — | — | — |
| NaY, washed | — | — | — | — | 150 | — | — | 100 | 714 |
| NH4+ Mordenite | — | — | — | — | — | — | — | 100 | 362 |
| Na Mordenite, washed | — | — | — | — | — | — | — | 97.2 | 358 |
| Water (Barnstead 20M ohm) | — | — | — | — | — | — | — | — | — |
| MgO | — | — | — | — | — | — | — | — | — |
| CaO (quicklime) | — | — | — | — | — | — | — | — | — |
| K/L zeolite | — | — | — | — | — | — | — | — | — |
| LZY82 pellets | — | — | — | — | — | — | — | 60.8 | 556 |
| LZY62 pellets | — | — | — | — | — | — | — | 73.5 | 624 |
| LZY52 pellets | — | — | — | — | — | — | — | 73.7 | 603 |

TABLE 3-continued

ILLUSTRATIVE EMBODIMENTS

| | | | | | | | | | |
|---|---|---|---|---|---|---|---|---|---|
| LZY82 powder | — | — | — | — | — | — | — | 109.8 | 550 |
| SDUSY | — | — | — | — | — | — | — | 85.6 | 595 |
| NH4+ Ferrierite | — | — | — | — | — | — | — | 107.1 | nd |
| Natural Erionite | — | — | — | — | 150 | — | — | 103.3 | nd |
| Natural Mordenite | — | — | — | — | 150 | — | — | 85.1 | 264 |
| Natural Chabazite | — | — | — | — | 150 | — | — | 39.8 | 356 |
| NaX | — | — | — | — | — | — | — | nd | nd |
| 4A (Na/A zeol.) | — | — | — | — | — | — | — | nd | 15 |
| 5A (Ca/A zeol.) | — | — | — | — | — | — | — | 1.3.1 | 456 |
| K methoxide | — | — | — | — | — | — | — | — | — |
| CaCO$_3$ | — | — | — | — | — | — | — | — | — |
| Ca(OH)$_2$ (lime) | — | — | — | — | — | — | — | — | — |
| Ca(NO$_3$)$_2$ | — | — | — | — | — | — | — | — | — |
| Ca acetate | — | — | — | — | — | — | — | — | — |
| Mg acetate | — | — | — | — | — | — | — | — | — |
| Ba acetate | — | — | — | — | — | — | — | — | — |
| Sr acetate | — | — | — | — | — | — | — | — | — |
| Ba hydroxide | — | — | — | — | — | — | — | — | — |
| Sr hydroxide | — | — | — | — | — | — | — | — | — |
| Mg hydroxide | — | — | — | — | — | — | — | — | — |

| Description | Structure | | | Basicity Resulting | | | |
|---|---|---|---|---|---|---|---|
| CATALYST | n-C8 | | | INDICATOR COLORS[i] | | | |
| System | wet- | Pore | pH | 4-nitro- | 4-chloro | 4-nitro- | 4-chloro- |
| Designation | ness | vol. | 1% | aniline/ | aniline/ | aniline/ | aniline/ |
| (Salt/Zeolite) | cc/g[f] | cc/g[g] | aq.[h] | DMSO | DMSO | benzene | benzene |
| 18 REFERENCE MATERIALS[j] | | | | | | | |
| KOH pellets | — | — | 14 | blue | beige | pinkish/lavender | clear |
| Shell Silica Spheres | — | — | 6 | yellow | beige | yellow | clear |
| Sodium Amide | — | — | 14 | dk blue | olive drab | dk blue | black |
| NaY, washed | — | 0.37 | 6 | yellow | nd | nd | cream |
| NH$_4$+ Mordenite | — | 0.22 | 6 | yellow | nd | nd | cream |
| Na Mordenite, washed | — | 0.19 | 7 | yellow | nd | nd | cream |
| Water (Barnstead 20M ohm) | — | — | 6 | — | — | — | — |
| MgO | — | — | 10 | yellow | nd | nd | cream |
| CaO (quicklime) | — | — | 13 | lt green | white | milky-yellow | cream |
| K/L zeolite | — | — | 7 | lt lime grn | cream | yellow | white |
| LZY82 pellets[k] | — | 0.396 | 6 | yellow | nd | nd | cream |
| LZY62 pellets | — | 0.395 | 5 | yellow | nd | nd | cream |
| LZY52 pellets | — | 0.411 | 6 | yellow/grn | nd | nd | cream |
| LZY82 powder | 0.524 | 0.398 | 6 | yellow | nd | nd | cream |
| SDUSY[l] | 0.590 | 0.54 | 6 | yellow | nd | nd | cream |
| NH$_4$+ Ferrierite | 0.696 | — | 5 | yellow | nd | nd | white |
| Natural Erionite | nd | — | 6 | golden | nd | nd | sl orng |
| Natural Mordenite | 1.03 | 0.409 | 6 | golden | nd | nd | cream |
| Natural Chabazite | nd | 0.164 | 7 | yellow | nd | nd | cream |
| NaX | 0.423 | nd | 7 | yellow | nd | nd | cream |
| A (Na/A zeol.) | 0.171 | 0.065 | 7 | yellow | nd | nd | cream |
| 5A (Ca/A zeol.) | 0.263 | 0.321 | 7 | yellow | nd | nd | cream |
| K methoxide | — | — | 14 | dk brown | nd | nd | off-white |
| CaCO$_3$ | — | — | 7 | yellow | cream | pale-yellow | cream |
| Ca(OH)$_2$ (lime) | — | — | 14 | dk green | white | dk gray | cream |
| Ca(NO$_3$)$_2$ | — | — | 7 | yellow | nd | nd | lt bluish |
| Ca acetate | — | — | 7 | yellow | nd | nd | white |
| Mg acetate | — | — | 7 | yellow | nd | nd | white |
| Ba acetate | — | — | 7 | yellow | cream | yellow | white |
| Sr acetate | — | — | 7 | yellow | white | pale-yellow | white |
| Ba hydroxide | — | — | 13 | dk green | nd | nd | cream |
| Sr hydroxide | — | — | | | | | |
| Mg hydroxide | — | — | 8 | lime green | nd | nd | cream |

| Description CATALYST System Designation (Salt/Zeolite) | | Materials used | | | Conditions | | | Structure XRD | |
|---|---|---|---|---|---|---|---|---|---|
| | Solvent | Solv. Wt. | Salt Wt. | Zeol. Wt. | Temp.[a] | Method[b] | Example[c] | % xtal[d] | S.A. sq. m./g[e] |
| B-1 | Ca(NO$_3$)$_2$/NaY | H$_2$O | 9 | 20.52 | 50.31 | 23 | I | A | | — |
| B-2 | NH$_3$/Ca/NaY | | 44 g NH$_3$ gas over 41.49 g of above zeolite | | | 23 | GI;P | A | | — |
| B-3 | Lime wash/Ca/NaY | H$_2$O | 200 | 0.28 | above | 110 | Wash/dry | A | 91 | — |
| B-4 | Ca(OH)x/NaY | | sample above | | | 450 | C | A | 92 | — |
| B-5 | Ca(NO$_3$)$_2$/NaY | H$_2$O | 30 | 23.31 | 50.0 | 100 | I | B | 53.7 | 7 |
| B-6 | | | sample above | | | 550 | C | B | 59.1 | 305 |
| B-7 | Mg(NO$_3$)$_2$/NaY | H$_2$O | 55 | 23.65 | 50.02 | 100 | I | B | 89.2 | 97 |
| B-8 | | | sample above | | | 550 | C | B | 93.4 | 496 |
| B-9 | Mg(OAc)$_2$/NaY | H$_2$O | 38 | 23.48 | 50.49 | 100 | I | C | 95.7 | 105 |
| B-10 | | | sample above | | | 550 | C | C | 71.6 | 525 |
| B-11 | Ca(OAc)$_2$/LZY52 plt | H$_2$O | 1.66 | 0.59 | 2.05 | 550 | I | C | 73 | 464 |
| B-12 | Ca(OAc)$_2$/LZY82 plt | H$_2$O | 2.27 | 0.81 | 2.05 | 550 | I | C | 74.4 | 447 |

TABLE 3-continued

ILLUSTRATIVE EMBODIMENTS

| | | | | | | | | | | |
|---|---|---|---|---|---|---|---|---|---|---|
| B-13 | Ca(OAc)$_2$/LZY62 plt | H$_2$O | 1.56 | 0.56 | 2.07 | 550 | I | C | 74.1 | 524 |
| B-14 | Ca(OAc)$_2$/LZY62 plt | H$_2$O | 2.21 | 0.79 | 2.03 | 550 | I | C | 71.5 | 474 |
| B-15$_1$ | Ca(OAc)$_2$/LZY82 plt | H$_2$O | 1.56 | 0.55 | 2.00 | 550 | I | C | 76.3 | 461 |
| B-15$_2$ | Ca(OAc)$_2$/LZY82 plt | H$_2$O | 4.46 | 1.58 | 4.01 | 150 | I | C | | |
| B-15$_3$ | NH$_4$OH/Ca/LZY82 plt | | 1.6 cc 10N NH$_4$OH on above | | | | I/P | D | | |
| B-16 | | | H$_2$O, 5 cc + 0.5 cc 10N NH$_4$OH | | | 150 | I/W | D | | |
| B-17 | | | | | | sample above 550 | C | D | 67.4 | |
| B-18 | Mg(OAc)$_2$/LZY82 plt | H$_2$O | 1.23 | 2.47 | 4.09 | 150 | I | C | | |
| | NH$_4$OH on above | | 1.6 cc of 10N NH$_4$OH on B-18 | | | | I/P | D | | |
| B-19 | NH$_4$OH on above | | H$_2$O, 5 cc + .5 cc 10N NH$_4$OH | | | 150 | I/W | D | | |
| B-20 | | | | sample above | | 550 | C | D | 89.1 | 438 |
| B-21 | Ca(OAc)$_2$/LZY82 pwd | H$_2$O | 4.45 | 1.58 | 4.00 | 150 | I | C | | |
| | NH$_4$OH on above | | 1.6 cc of 10N NH$_4$OH on B-21 | | | | I/P | D | | |
| B-22 | NH$_2$OH on above | | 5 cc H$_2$O + .5 cc 10N NH$_4$OH | | | 150 | I/W | D | | |
| B-23 | | | | sample above | | 550 | C | D | 73.9 | 481 |
| B-24 | Mg(OAc)$_2$/LZY82 pwd | H$_2$O | 2.23 | 2.4 | 4.03 | 150 | I | C | | |
| | redistribute salt | H$_2$O | 3 × 1.5 cc | 0 | above | 150 | "I" | E | | |
| | NH$_4$OH on above | | 1.6 cc of 10N NH$_4$OH on B-24 | | | | I/P | E | | |
| | NH$_4$OH on above | | 5 cc H$_2$O + .5 cc 10N NH$_4$OH | | | 150 | I/W | E | | |
| | | | | sample above | | 550 | C | E | 82.5 | 479 |
| B-25 | Ca(OAc)$_2$/Erionite | H$_2$O | 2.22 | 0.79 | 1.01 | 150 | I | C | | |
| | | H$_2$O | 2 × 1.5 | 0 | above | 150 | "I" | F | | |
| | | | | sample above | | 550 | C | F | 54.5 | 68 |
| B-26 | Ca(OAc)$_2$/Mordent. | H$_2$O | 2.98 | 1.06 | 2.03 | 150 | I | C | | |
| | | H$_2$O | 2 × 1.9 | 0 | above | 150 | "I" | F | | |
| | | | | sample above | | 550 | C | F | 26 | 103 |

| Description CATALYST System Designation (Salt/Zeolite) | Structure | | Basicity Resulting | | | | |
|---|---|---|---|---|---|---|---|
| | n-C$_8$ wetness cc/g$^f$ | Pore vol. cc/g$^g$ | pH 1% aq.$^h$ | INDICATOR COLORS$^i$ | | | |
| | | | | 4-nitro-aniline/ DMSO | 4-chloro-aniline/ DMSO | 4-nitro-aniline/ benzene | 4-chloro-aniline/ benzene |
| B-1 Ca(NO$_3$)$_2$/NaY | — | — | | | | | |
| B-2 NH$_3$/Ca/NaY | — | | 7 | yellow | nd | nd | white |
| B-3 Lime wash/Ca/NaY | — | | 7 | yellow | nd | nd | white |
| B-4 Ca(OH)$_x$/NaY | — | | 8 | yellow | nd | nd | cream |
| B-5 Ca(NO$_3$)$_2$/NaY | — | .02 | 7 | yellow | nd | nd | cream |
| B-6 | | .181 | 9 | lt yell/grn | nd | nd | cream |
| B-7 Mg(NO$_3$)$_2$/NaY | — | .072 | 8 | yellow | nd | nd | cream |
| B-8 | — | .281 | 9 | yellow/grn | nd | nd | cream |
| B-9 Mg(OAc)$_2$/NaY | — | .09 | 8 | yellow | nd | nd | cream |
| B-10 | — | .287 | 10 | dk blue/grn | nd | nd | bwn/amber |
| B-11 Ca(OAc)$_2$/LZY52 plt | — | 0.347 | 11 | kelly green | nd | nd | dk brown |
| B-12 Ca(OAc)$_2$/LZY82 plt | — | 0.34 | 10 | yellow | nd | nd | dk brown |
| B-13 Ca(OAc)$_2$/LZY62 plt | — | 0.34 | 8 | blk/yell liq | nd | nd | dk/amber liq |
| B-14 Ca(OAc)$_2$/LZY62 plt | — | 0.33 | 6 | dk lime grn | nd | nd | brown |
| B-15$_1$ Ca(OAc)$_2$/LZY82 plt | — | 0.34 | 9 | lime green | nd | nd | cream |
| B-15$_2$ NH$_4$OH/Ca/LZY82 plt | | | | | | | |
| B-15$_3$ Ca(OAc)$_2$/LZY82 plt | | | | | | | |
| B-16 | | | | | | | |
| B-17 | — | 0.33 | 9 | gray/green | nd | nd | gray/bwn |
| B-18 Mg(OAc)$_2$/LZY82 plt | | | | | | | |
| NH$_4$OH on above | | | | | | | |
| B-19 NH$_4$H on above | | | | | | | |
| B-20 | — | 0.349 | 9 | gray/grn liq | nd | nd | gray & bwn |
| B-21 Ca(OAc)$_2$/LZY82 pwd | | | | | | | |
| NH$_4$OH on above | | | | | | | |
| B-22 NH$_4$OH on above | | | | | | | |
| B-23 | — | 0.296 | 8 | dk/golden liq | nd | nd | dk bwn |
| B-24 Mg(OAc)$_2$/LZY82 pwd redistribute salt NH$_4$OH on above NH$_4$OH on above | | | | | | | |
| | — | 0.294 | 9 | dark/dk golden liq | dk-purple | black | dark |
| B-25 Ca(OAc)$_2$/Erionit | — | | | | | | |
| | — | | | | | | |
| | | 0.06 | 9 | dark green | nd | nd | dark |
| B-26 Ca(OAc)$_2$/Mordent | — | | | | | | |
| | — | | | | | | |
| | | 0.29 | 9 | dark green | nd | nd | lt bwn |

Part C

| Description CATALYST System Designation (Salt/Zeolite) | Materials used | | | Conditions | | Structure | |
|---|---|---|---|---|---|---|---|
| | Solvent | Solv. Wt. | Salt Wt. | Zeol. Wt. | Temp.$^a$ Method$^b$ Example$^c$ | XRD % xtal$^d$ | S.A. sq. m./g$^e$ |

5,053,372

TABLE 3-continued

ILLUSTRATIVE EMBODIMENTS

| | | | | | | | | | | |
|---|---|---|---|---|---|---|---|---|---|---|
| C-1 | Ca(OAc)₂/Chabaz. | H₂O | .03 | .01 | .11 | 150 | I | G | | |
| C-2 | | | sample above | | | 550 | C | G | 21 | — |
| C-3 | Mg(OAc)₂/NaMord. | H₂O | .33 | .67 | 4.01 | 150 | I | C | | |
| | | H₂O | 1.0 | 0 | above | 150 | "I" | F | | |
| | | | sample above | | | 550 | C | F | 93.2 | 21 |
| C-4 | Ca(OAc)₂/NaMord. | H₂O | .74 | .26 | 4.0 | 150 | I | G | | |
| | | H₂O | 1.0 | 0 | above | 150 | "I" | H | | |
| | | | sample above | | | 550 | C | H | 89.6 | 19 |
| C-5 | Mg(OAc)₂/WshNaMord | H₂O | .33 | .67 | 4.00 | 150 | I | G | | |
| | | H₂O | 1.00 | 0 | above | 150 | "I" | H | | |
| | | | sample above | | | 550 | C | H | 96.4 | 122 |
| C-6 | Ca(OAc)₂/WshNaMord | H₂O | .74 | .26 | 4.06 | 150 | I | G | | |
| | | H₂O | 1.00 | 0 | above | 150 | "I" | H | | |
| | | | sample above | | | 550 | C | H | 81.7 | 171 |
| C-7 | Mg(OAc)₂/NH₄Morden. | H₂O | 40 cc | 2 Molar | 4.02 | 23 | S | I | | |
| | | H₂O | 2 × 50 | 0 | above | 150 | W | I | | |
| | | H₂O | 40 cc | 2 Molar | above | 23 | S | I | | |
| | | H₂O | 2 × 50 | 0 | above | 150 | W | I | — | — |
| | | H₂O | 40 cc | 2 Molar | above | 23 | S | I | | |
| C-8 | | H₂O | 2 × 50 | 0 | above | 150 | W | I | 108 | 326 |
| C-9 | Ca(OAc)₂/NH₄Morden. | H₂O | 40 cc | 2 Molar | 4.01 | 23 | S | I | | |
| | | H₂O | 2 × 50 | 0 | above | 150 | W | I | | |
| | | H₂O | 40 cc | 2 Molar | above | 23 | S | I | | |
| | | H₂O | 2 × 50 | 0 | above | 150 | W | I | — | — |
| | | H₂O | 40 cc | 2 Molar | above | 23 | S | I | | |
| C-10 | | H₂O | 2 × 50 | 0 | above | 150 | W | I | 94 | 340 |
| C-11 | Mg(OAc)₂/LZY82 | H₂O | 40 cc | 2 Molar | 4.03 | 23 | S | I | | |
| | | H₂O | 2 × 50 | 0 | above | 150 | W | I | | |
| | | H₂O | 40 cc | 2 Molar | above | 23 | S | I | | |
| | | H₂O | 2 × 50 | 0 | above | 150 | W | I | — | — |
| | | H₂O | 40 cc | 2 Molar | above | 23 | S | I | | |
| C-12 | | H₂O | 2 × 50 | 0 | above | 150 | W | I | 130 | 552 |
| C-13 | Ca(OAc)₂/LZY82 | H₂O | 40 cc | 2 Molar | 4.03 | 23 | S | I | | |
| | | H₂O | 2 × 50 | 0 | above | 150 | W | I | | |
| | | H₂O | 40 cc | 2 Molar | above | 23 | S | I | | |
| | | H₂O | 2 × 50 | 0 | above | 150 | W | I | — | — |
| | | H₂O | 40 cc | 2 Molar | above | 23 | S | I | | |
| C-14 | | H₂O | 2 × 50 | 0 | above | 150 | W | I | 119 | 549 |

| Description CATALYST System Designation (Salt/Zeolite) | Structure n-C8 | | | Basicity Resulting INDICATOR COLORS[i] | | | |
|---|---|---|---|---|---|---|---|
| | wet-ness cc/g[f] | Pore vol. cc/g[g] | pH 1% aq.[h] | 4-nitro-aniline/ DMSO | 4-chloro-aniline/ DMSO | 4-nitro-aniline/ benzene | 4-chloro-aniline/ benzene |
| C-1 Ca(OAc)₂/Chabaz. | | | | | | | |
| C-2 | — | — | 7 | yellow | nd | nd | white |
| C-3 Mg(OAc)₂/NaMord. | — | | | | | | |
| | — | 0.03 | 8 | lt green | nd | nd | pale lav. |
| C-4 Ca(OAc)₂/NaMord. | — | | | | | | |
| | — | 0.03 | 7 | lime green | nd | nd | cream |
| C-5 Mg(OAc)₂/WshNaMord | — | | | | | | |
| | — | 0.08 | 9 | lime & dk green | nd | nd | lt lav. & bwn |
| C-6 Ca(OAc)₂/WshNaMord | — | | | | | | |
| | — | 0.1 | 9 | lime green | nd | nd | lt lav. & bwn |
| C-7 Mg(OAc)₂/NH₄Morden | — | | | | | | |
| | — | — | 6 | nd | nd | nd | nd |
| | — | — | 6 | nd | nd | nd | nd |
| C-8 | — | 0.18 | 6 | yellow | nd | nd | cream |
| C-9 Ca(OAc)₂/NH₄Morden. | | | | | | | |
| | — | — | 6 | nd | nd | nd | nd |
| | — | — | 6 | nd | nd | nd | nd |
| C-10 | — | 0.19 | 6 | yellow | nd | nd | cream |
| C11 Mg(OAc)₂/LZY82 | | | | | | | |
| | — | — | 6 | nd | nd | nd | nd |
| | — | — | 6 | nd | nd | nd | nd |
| C-12 | 0.557 | 0.314 | 6 | yellow | nd | nd | cream |
| C-13 Ca(OAc)₂/LZY82 | | | | | | | |
| | — | — | 6 | nd | nd | nd | nd |
| | — | — | 6 | nd | nd | nd | nd |

TABLE 3-continued
ILLUSTRATIVE EMBODIMENTS

| | | | | | | | | | |
|---|---|---|---|---|---|---|---|---|---|
| C-14 | | 0.748 | 0.317 | 6 | yellow | nd | nd | cream | |

Part D

| Description CATALYST System Designation (Salt/Zeolite) | | Materials used | | | Conditions | | | Structure XRD | |
|---|---|---|---|---|---|---|---|---|---|
| | Solvent | Solv. Wt. | Salt Wt. | Zeol. Wt. | Temp.[a] | Method[b] | Example[c] | % xtal[d] | S.A. q.m./g[e] |
| D-1 Mg(OAc)$_2$/WshNaY | H$_2$O | 8.5 | 7.0 | 15.02 | 550 | I | C | 97.3 | 573 |
| D-2 Ca(OAc)$_2$/WshNaY | H$_2$O | 15 | 5.14 | 15.03 | 150 | I | J | | |
| NH$_4$OH on above | 6 cc of 10N | | | | | I/P | J | | |
| | 22 cc of 1N | | | | | W | J | | |
| | above sample | | | | 550 | C | J | 88.4 | 619 |
| D-3 Ca(NO$_3$)$_2$/NaY | H$_2$O | 8.5 | 20.5 | 50.04 | 23 | K | | | |
| K$_2$CO$_3$ on above | H$_2$O | 10.8 | 15.2 | above | 60 | I/P | K | | |
| D-4 Lime wash of above | H$_2$O | 400 | 0.56 | above | 100 | W | K | 63 | — |
| D-5 | above sample | | | | 550 | C | K | 50 | — |
| D-6 | | | | | above sample | 700 | C/C | K | low |
| D-7 Mg(OAc)$_2$/WshKL | H$_2$O | 1.51 | 0.93 | 2.00 | 150 | I | C | 44.1 | 18 |
| D-8 | above sample | | | | 550 | C | C | 94.2 | 34 |
| D-9 Mg(OAc)$_2$/Mordenit | H$_2$O | 0.99 | 0.62 | 1.32 | 150 | I | C | 96.7 | 135 |
| D-10 | above sample | | | | 550 | C | C | 88.7 | 163 |
| D-11 Mg(OAc)$_2$/WshNaMord | H$_2$O | 2.32 | 2.44 | 3.08 | 150 | I | C | | |
| D-12 | H$_2$O | 1 | 0 | above | 150 | "I" | F | 94.0 | 32 |
| D-13 | above sample | | | | 550 | C | F | 85.1 | 18 |
| D-14 Mg(OAc)$_2$/NH$_4$Morden | H$_2$O | 1.90 | 1.18 | 2.53 | 150 | I | C | 79.6 | 88 |
| D-15 | above sample | | | | 550 | C | C | 43.4 | 197 |
| D-16 Mg(OAc)/LZY82 pwdr | H$_2$O | 1.98 | 1.23 | 2.62 | 150 | I | C | 83.8 | 351 |
| D-17 | above sample | | | | 550 | C | C | 76.0 | 455 |
| D-18 Mg(OAc)$_2$/NH$_4$Ferri. | H$_2$O | 0.99 | 0.61 | 1.36 | 150 | I | C | 77.6 | 179 |
| D-19 | above sample | | | | 550 | C | C | 109.9 | 257 |
| D-20 Mg(OAc)$_2$/KL | H$_2$O | 1.61 | 0.99 | 2.20 | 150 | I | C | 74.8 | 21 |
| D-21 | above sample | | | | 550 | C | C | 89.4 | 29 |
| D-22 Mg(OAc)$_2$/NH$_4$VUSY | H$_2$O | 1.65 | 1.01 | 2.14 | 150 | I | C | 83.1 | 399 |
| D-23 | sample above | | | | 550 | C | C | 75.7 | 485 |
| D-24 Mg(OAc)$_2$/Chabazite | H$_2$O | 0.86 | 0.53 | 1.13 | 150 | I | C | 32.9 | 268 |
| D-25 | sample above | | | | 550 | C | C | 83.6 | 347 |
| D-26 Mg(OAc)$_2$/LZY82 plts | H$_2$O | 2.50 | 3.10 | 3.52 | 150 | I | C | | |
| | H$_2$O | 1 | 0 | above | 150 | "I" | L | | |
| D-27 | H$_2$O | 1 | 0 | above | 150 | "I" | L | 37 | 278 |
| D-28 | sample above | | | | 550 | C | L | 60 | 399 |
| D-29 Mg(OAc)$_2$/NH$_4$USY | H$_2$O | 1.96 | 2.44 | 2.60 | 150 | I | M | 80 | 48 |
| D-30 | above sample | | | | 550 | C | M | 57 | 402 |
| D-31 Ca(OAc)$_2$/WshNaMord | H$_2$O | 2.26 | 0.72 | 2.09 | 150 | I | C | 64 | 11 |
| D-32 | sample above | | | | 550 | C | C | 69 | 109 |
| D-33 Ca(OAc)$_2$/Mordenite | H$_2$O | 1.63 | 0.52 | 1.49 | 150 | I | G | 86 | 83 |
| D-34 | sample above | | | | 550 | C | G | 78 | 126 |
| D-35 Ca(OAc)$_2$/LZY82 pwdr | H$_2$O | 3.16 | 1.00 | 2.83 | 150 | I | C | 68 | 401 |
| D-36 | above sample | | | | 550 | C | C | 63 | 463 |

| Description CATALYST System Designation (Salt/Zeolite) | Structure | | | Basicity Resulting INDICATOR COLORS[i] | | | |
|---|---|---|---|---|---|---|---|
| | n-Ca wetness cc/g[f] | Pore vol. cc/g[g] | pH 1% aq.[h] | 4-nitro-aniline/ DMSO | 4-chloro-aniline/ DMSO | 4-nitro-aniline/ benzene | 4-chloro-aniline/ benzene |
| D-1 Mg(OAc)$_2$/WshNaY | — | 0.32 | 11 | dark grn/lt grn liq | nd | nd | lt lavender |
| D-2 Ca(OAc)$_2$/WshNaY | — | | | | | | |
| NH$_4$OH on above | — | | | | | | |
| | — | 0.33 | 8 | dark green | nd | nd | dark brown |
| D-3 Ca(NO$_3$)$_2$/NaY | | | | | | | |
| K$_2$CO$_3$ on above | | | | | | | |
| D-4 Lime wash of above | — | — | 9 | yellow | nd | nd | white |
| D-5 | — | — | 9 | yellow & green | nd | nd | white |
| D-6 | | | | | | | |
| D-7 Mg(OAc)$_2$/WshKL | — | 0.064 | 7 | blue green | nd | nd | cream |
| D-8 | — | 0.092 | | dark green | nd | nd | pale tan |
| D-9 Mg(OAc)$_2$/Mordenit | — | 0.277 | 8 | lt lime green | nd | nd | cream |
| D-10 | — | 0.299 | 8 | dk grn/yell liq | nd | nd | dk purple |
| D-11 Mg(OAc)$_2$/WshNaMord | | | | | | | |
| D-12 | — | 0.052 | 8 | pale green | nd | nd | cream |
| D-13 | — | 0.037 | 8 | dark green | nd | nd | lt lavender |
| D-14 Mg(OAc)$_2$/NH$_4$Morden | — | 0.077 | 9 | lt & dk green | nd | nd | cream |
| D-15 | — | 0.128 | 8 | dark green | nd | nd | lt gray |
| D-16 Mg(OAc)$_2$/LZY82 pwdr | — | 0.219 | 6 | yellow | nd | nd | cream |
| D-17 | — | 0.274 | 8 | black/green | nd | nd | dk purple |

TABLE 3-continued
ILLUSTRATIVE EMBODIMENTS

| | | | | | | | | |
|---|---|---|---|---|---|---|---|---|
| D-18 | Mg(OAc)₂/NH₄Ferri. | — | 0.10 | 9 | pale green | nd | nd | white |
| D-19 | | — | 0.17 | 9 | lt/dk green | nd | nd | cream/yell |
| D-20 | Mg(OAc)₂/KL | — | 0.07 | 8 | pale blue/grn | nd | nd | white |
| D-21 | | — | 0.07 | 10 | dk blue/grn | nd | nd | lavender |
| D-22 | Mg(OAc)₂/NH₄VUSY | — | 0.32 | 8 | yellow | nd | nd | cream |
| D-23 | | — | 0.38 | 8 | dark green | nd | nd | lavender |
| D-24 | Mg(OAc)₂/Chabazite | — | 0.13 | 8 | yellow grn | nd | nd | cream |
| D-25 | | — | 0.17 | 9 | dk blue grn | nd | nd | light tan |
| D-26 | Mg(OAc)₂/LZY82 plts | | | | | | | |
| D-27 | | — | 0.23 | 8 | white plts/grn liq | nd | nd | white |
| D-28 | | — | 0.32 | 9 | dark-green | purple | dk-purple | dark plts |
| D-29 | Mg(OAc)₂/NH₄USY | — | 0.07 | 7 | yellow | nd | nd | white |
| D-30 | | — | 0.26 | 9 | blackish green | nd | nd | dark purple |
| D-31 | Ca(OAc)₂/WshNaMord | — | 0.03 | 8 | yellow grn | nd | nd | white |
| D-32 | | — | 0.08 | 10 | black/golden liq | nd | nd | dk purp & lvd |
| D-33 | Ca(OAc)₂/Mordenite | — | 0.25 | 7 | yellow | nd | nd | cream |
| D-34 | | — | 0.26 | 9 | black & green | nd | nd | deep purple |
| D-35 | Ca(OAc)₂/LZY82 pwdr | — | 0.25 | 6 | yellow | nd | nd | cream |
| D-36 | | — | 0.29 | 8 | dark green | nd | nd | deep purple |

Part E

| Description CATALYST System Designation (Salt/Zeolite) | Solvent | Materials used Solv. Wt. | Salt Wt. | Zeol. Wt. | Conditions Temp.$^a$ | Method$^b$ | Example$^c$ | Structure XRD % xtal$^d$ | S.A. sq. m./g$^e$ |
|---|---|---|---|---|---|---|---|---|---|
| E-1 | Ca(OAc)₂/WshKL | H₂O | 3.76 | 1.19 | 3.47 | 150 | I | C | 69 | 28 |
| E-2 | | | sample above | | | 550 | C | C | 79 | 61 |
| E-3 | Ca(OAc)₂/NH₄Morden | H₂O | 3.01 | 0.95 | 2.76 | 150 | I | C | 64 | 182 |
| E-4 | | | sample above | | | 550 | C | C | 50 | 242 |
| E-5 | Ca(OAc)₂/KL | H₂O | 3.88 | 1.23 | 3.58 | 150 | I | C | 60 | 17 |
| E-6 | | | sample above | | | 550 | C | C | 75 | 88 |
| E-7 | Ca(OAc)₂/NH₄Ferrie | H₂O | 1.75 | 0.55 | 1.61 | 150 | I | C | 59 | 180 |
| E-8 | | | sample above | | | 550 | C | C | 88 | 226 |
| E-9 | Ca(OAc)₂/LZY82 plts | H₂O | 5.53 | 1.76 | 5.11 | 150 | I | C | 57.6 | 276 |
| E-10 | | | sample above | | | 550 | C | C | 58.3 | 429 |
| E-11 | Ca(OAc)₂/NH₄VUSY | H₂O | 2.44 | 0.77 | 2.25 | 150 | I | C | 50.6 | — |
| E-13 | | | sample above | | | 550 | C | C | 60.6 | 468 |
| E-14 | Ca(OAc)₂/Chabazite | H₂O | 0.76 | 0.24 | 1.04 | 150 | I | C | 88.2 | 265 |
| E-15 | | | sample above | | | 550 | C | C | 38.9 | 20 |
| E-16 | Ca(OAc)₂/NH₄USY | H₂O | 2.74 | 0.87 | 2.53 | 150 | I | C | 75.2 | 429 |
| E-17 | | | sample above | | | 550 | C | C | 59.5 | 496 |
| E-18 | Sr(OAc)₂/WshNaY | H₂O | 2.53 | 0.99 | 2.11 | 150 | I | C | 73 | 182 |
| E-19 | | | sample above | | | 550 | C | C | 49 | 361 |
| E-20 | Sr(OAc)₂/WshNaMord | H₂O | 2.43 | 0.95 | 2.02 | 150 | I | C | 70 | 14 |
| E-21 | | | sample above | | | 550 | C | C | 48 | 14 |
| E-22 | Sr(OAc)₂/NH₄Morden | H₂O | 2.54 | 1.00 | 2.11 | 150 | I | C | 66.9 | 186 |
| E-23 | | | above material | | | 550 | C | C | 55 | 133 |
| E-24 | Sr(OAc)₂/LZY82 plts | H₂O | 5.02 | 1.97 | 4.17 | 150 | I | C | 43.1 | 272 |
| E-25 | | | sample above | | | 550 | C | C | 54.4 | 382 |
| E-26 | Sr(OAc)₂/LZY82 pwdr | H₂O | 2.2 | 0.86 | 1.82 | 150 | I | C | 52.7 | 310 |
| E-27 | | | sample above | | | 550 | C | C | 47.7 | 381 |
| E-28 | Ba(OAc)₂/LZY82 pwdr | H₂O | 1.78 | 1.27 | 2.23 | 150 | I | C | 22.6 | 247 |
| E-29 | | | sample above | | | 550 | C | C | 13.9 | 354 |
| E-30 | Ba(OAc)₂/NH₄Morden | H₂O | 1.63 | 1.15 | 1.92 | 150 | I | C | 34.4 | 66 |
| E-31 | | | sample above | | | 550 | C | C | 25.3 | 102 |
| E-32 | Ba(OAc)₂/WshNaMord | H₂O | 1.52 | 1.08 | 1.82 | 150 | I | C | 35 | 7 |
| E-33 | | | sample above | | | 550 | C | C | 24.4 | 23 |
| E-34 | Ba(OAc)₂/LZY82 plts | H₂O | 2.77 | 1.96 | 3.49 | 150 | I | C | 22.5 | 227 |
| E-35 | | | sample above | | | 550 | C | C | 18.9 | 381 |
| E-36 | Ba(OAc)₂/WshNaY | H₂O | 1.46 | 1.03 | 1.82 | 150 | I | C | 18.2 | 82 |
| E-37 | | | sample above | | | 550 | C | C | 10 | 234 |
| E-38 | Mg(OAc)₂/Mg/NH₄Mord | MeOH | 0.3 | 0.21 | 1.00 | 150 | I | N | 86.7 | 143 |
| E-39 | | | sample above | | | 550 | C | N | 46.7 | 265 |
| E-40 | Mg(OAc)₂/Mg/NH₄Mord | MeOH | 1.0 | 0.7 | 1.04 | 150 | I | N | — | — |
| E-41 | | MeOH | 0.5 | above | | 150 | "I" | R | 79.1 | nd |
| E-42 | | | sample above | | | 550 | C | R | 45.9 | 258 |
| E-43 nd | Mg(OAc)₂/Mg/LZY82 | MeOH | 0.3 | 0.2 | 1.00 | 150 | I | N | 75.6 | |
| E-44 | | | sample above | | | 550 | C | N | 81 | 493 |
| E-45 | Mg(OAc)₂/Mg(OAc)₂/ | MeOH | 0.6 | 0.4 | 1.00 | 150 | I | N | | |
| E-46 | LZY82 | MeOH | 0.5 | sample above | | 150 | "I" | R | 66.6 | 277 |
| E-47 | | | sample above | | | 550 | C | R | 65.3 | 387 |
| E-48 | Mg(OAc)₂/Mg(OAc)₂/ | DMSO | 0.25 | 0.15 | 1.07 | 200 | I | O | 56.3 | 125 |
| E-49 | NH₄ + Mordenite | | sample above | | | 550 | C | O | 53.9 | 264 |
| E-50 | Mg(OAc)₂/Mg(OAc)₂/ | DMSO | 0.25 | 0.15 | 1.02 | 200 | I | O | 41.8 | 363 |
| E-51 | LZY82 | | sample above | | | 550 | C | O | 74.8 | 452 |

| Description CATALYST | Structure n-C8 | Basicity Resulting INDICATOR COLORS$^i$ |
|---|---|---|

TABLE 3-continued

ILLUSTRATIVE EMBODIMENTS

| System Designation (Salt/Zeolite) | wet-ness cc/g[f] | Pore vol. cc/g[g] | pH 1% aq.[h] | 4-nitro-aniline/ DMSO | 4-chloro aniline/ DMSO | 4-nitro-aniline/ benzene | 4-chloro-aniline/ benzene |
|---|---|---|---|---|---|---|---|
| E-1 Ca(OAc)$_2$/WshKL | — | 0.074 | 7 | dk grn/yell liq | nd | nd | cream |
| E-2 | — | 0.091 | 11 | dark-green | dk-pink/bwn | bwn | deep-purple |
| E-3 Ca(OAc)$_2$/NH$_4$Morden | — | 0.11 | 7 | yellow | nd | nd | white |
| E-4 | — | 0.154 | 8 | dark grn/gold | nd | nd | deep purple |
| E-5 Ca(OAc)$_2$/KL | — | 0.04 | 7 | lime green | nd | nd | white |
| E-6 | — | 0.091 | 11 | dark green | nd | nd | deep purple |
| E-7 Ca(OAc)$_2$/NH$_4$Ferrie | — | 0.129 | 7 | yellow | nd | nd | white |
| E-8 | — | 0.165 | 9 | black/golden | nd | nd | deep purple |
| E-9 Ca(OAc)$_2$/LZY82 plts | — | 0.232 | 7 | yellow | nd | nd | white |
| E-10 | — | 0.332 | 7 | black/yellow | nd | nd | dark |
| E-11 Ca(OAc)$_2$/NH$_4$VUSY | — | — | 7 | yellow | nd | nd | white |
| E-13 | — | 0.392 | 9 | dark green | nd | nd | deep purple |
| E-14 Ca(OAc)$_2$/Chabazite | — | 0.12 | 7 | yellow | nd | nd | white |
| E-15 | — | 0.02 | 7 | black/yellow | nd | nd | deep purple |
| E-16 Ca(OAc)$_2$/NH$_4$USY | — | 0.266 | 6 | yellow | nd | nd | cream |
| E-17 | — | 0.313 | 7 | blackish green | nd | nd | dark purple |
| E-18 Sr(OAc)$_2$/WshNaY | — | 0.12 | 8 | yellow | nd | nd | cream |
| E-19 | — | 0.21 | 11 | dk-green | dk-purple | dk-olive | dk-purple |
| E-20 Sr(OAc)$_2$/WshNaMord | — | 0.23 | 8 | lime green | nd | nd | white |
| E-21 Sr(OAc)$_2$/NH$_4$Morden | — | 0.24 | 9 | blck/gold | dk-purple | dk-purple | dk-purple |
| E-22 | — | 0.12 | 8 | yellow | nd | nd | white |
| E-23 | — | 0.09 | 9 | dk grn/gold liq | dark purple | dark purple | dark purple |
| E-24 Sr(OAc)$_2$/LZY82 plts | — | 0.22 | 6 | yellow | nd | nd | white |
| E-25 | — | 0.294 | 8 | dk grn/gold liq | gray | bwn | purple |
| E-26 Sr(OAc)$_2$/LZY82 pwdr | — | 0.19 | 6 | yellow | nd | nd | cream |
| E-27 | — | 0.234 | 8 | dark green | nd | nd | dark purple |
| E-28 Ba(OAc)$_2$/LZY82 pwdr | — | 0.16 | 6 | yellow | nd | nd | cream |
| E-29 | — | 0.22 | 8 | black-green | nd | nd | dark purple |
| E-30 Ba(OAc)$_2$/NH$_4$Morden | — | 0.05 | 7 | yellow | nd | nd | white |
| E-31 | — | 0.08 | 8 | black/gold liq | nd | nd | dark purple |
| E-32 Ba(OAc)$_2$/WshNaMord | — | 0.02 | 8 | lt lime green | nd | nd | white |
| E-33 | — | 0.03 | 8 | dk-green | dk-purple | dk-purple | dk-purple |
| E-34 Ba(OAc)$_2$/LZY82 plts | — | 0.20 | 7 | yellow | nd | nd | white |
| E-35 | — | 0.291 | 8 | black/gold liq | nd | nd | dark purple |
| E-36 Ba(OAc)$_2$/WshNaY | — | 0.07 | 7 | yellow | nd | nd | white |
| E-37 | — | 0.139 | 10 | dk green | nd | nd | dk purple |
| E-38 Mg(OAc)$_2$/Mg/NHMord | — | 0.091 | 7 | yellow | nd | nd | cream |
| E-39 | — | 0.15 | 8 | black/gold liq | nd | nd | dark purple |
| E-40 Mg(OAc)$_2$/Mg/NH$_4$Mord. | — | — | | | | | |
| E-41 | — | nd | 9 | blue green | nd | nd | cream |
| E-42 | — | 0.16 | 8 | black/gold liq | nd | nd | black |
| E-43 Mg(OAc)$_2$/Mg/LZY82 | — | nd | 7 | yellow | nd | nd | cream |
| E-44 | — | 0.302 | 7 | black/gold liq | nd | nd | dk purple |
| E-45 Mg(OAc)$_2$/Mg(OAc)$_2$/ | | | | | | | |
| E-46 LZY82 | — | 0.182 | 7 | green | nd | nd | cream |
| E-47 | — | 0.237 | 8 | black/gold liq | nd | nd | dark purple |
| E-48 Mg(OAc)$_2$/Mg(OAc)$_2$/ | — | 0.09 | 7 | yellow | nd | nd | cream |
| E-49 NH$_4$ + Mordenite | 0.16 | | 8 | black-/gold liq | nd | nd | black |
| E-50 Mg(OAc)$_2$/Mg(OAc)$_2$/ | — | 0.22 | 7 | yellow | nd | nd | cream |
| E-51 LZY82 | — | 0.28 | 7 | black/gold liq | nd | nd | black |

Part F

| Description CATALYST System Designation (Salt/Zeolite) | Materials used | | | | Conditions | | Structure XRD | |
|---|---|---|---|---|---|---|---|---|
| | Solvent | Solv. Wt. | Salt Wt. | Zeol. Wt. | Temp.[a] | Method[b] | Example[c] | % xtal[d] | S.A. sq. m./g[e] |
| F-1 Sr(OAc)$_2$/5A | H$_2$O | 2.45 | 0.97 | 2.02 | 150 | I | C | 70.4 | 235 |
| F-2 | sample above | | | | 550 | C | C | 79.0 | 268 |
| F-3 Ba(OAc)$_2$/5A | H$_2$O | 1.79 | 1.27 | 2.26 | 150 | I | C | 22.4 | 64 |
| F-4 | sample above | | | | 550 | C | C | 32.0 | 124 |
| F-5 Ca(OAc)$_2$/5A | H$_2$O | 2.27 | 0.72 | 2.10 | 150 | I | C | 84.2 | 266 |
| F-6 | sample above | | | | 550 | C | C | 80.8 | 273 |
| F-7 Ba(OAc)$_2$/5A | H$_2$O | 5.0 | 1.72 | 4.03 | 150 | I | C | — | — |
| NH$_4$OH/Ba(OAc)$_2$/5A | 1.6 cc of 10N NH$_4$OH | | | | room | P | D | — | — |
| F-8 | 5.5 cc 1N NH$_4$OH above | | | | 150 | S/W | D | 53.3 | 64 |
| F-9 | sample above | | | | 550 | C | D | 48.0 | 61 |
| F-10 Sr(OAc)$_2$/5A | H$_2$O | 4.0 | 1.47 | 4.00 | 150 | I | C | — | — |
| NH$_4$OH/Sr(OAc)$_2$/5A | 1.6 cc of 10N NH$_4$OH | | | | room | P | D | — | — |
| F-11 | 5.5 cc 1N NH$_4$OH above | | | | 150 | S/W | D | 84.5 | — |
| F-12 | sample above | | | | 550 | C | D | 85.7 | 322 |
| F-13 Mg(OAc)$_2$/5A | MeOH | 0.2 | 0.14 | 1.00 | 150 | I | G | 90.7 | — |
| F-14 | sample above | | | | 550 | C | G | 111.9 | 417 |

TABLE 3-continued

ILLUSTRATIVE EMBODIMENTS

| | | | | | | | | | | |
|---|---|---|---|---|---|---|---|---|---|---|
| F-15 | Ba(OAc)$_2$/5A | H$_2$O | 3.5 | 1.69 | 4.02 | 150 | I | C | — | — |
| | K$_2$CO$_3$/Ba(OAc)$_2$/5A | H$_2$O | 1.43 | 1.43 | above | room | P | K | — | — |
| F-16 | K$_2$CO$_3$ on above | H$_2$O | 5.5 | 0.5 | above | 150 | S/W | K | 44.6 | — |
| F-17 | | sample above | | | | 550 | C | K | 46.5 | 15 |
| F-18 | Sr(OAc)$_2$/5A | H$_2$O | 3.5 | 1.51 | 4.00 | 150 | I | C | — | — |
| | K$_2$CO$_3$/Sr(OAc)$_2$/5A | H$_2$O | 1.39 | 1.39 | above | room | P | K | — | — |
| F-19 | K$_2$CO$_3$ on above | H$_2$O | 5.5 | 0.5 | above | 150 | S/W | K | 55.6 | — |
| F-20 | | sample above | | | | 550 | C | K | 61.7 | 30 |
| F-21 | Mg(OAc)$_2$/5A | DMSO | 0.5 | 0.26 | 2.05 | 150 | I | O | 86.1 | 387 |
| F-22 | | sample above | | | | 550 | C | O | 105.1 | — |
| F-23 | Ba(OAc)$_2$/5A | H$_2$O | 6.94 | 4.57 | 10.2 | 150 | I | C | — | — |
| | NH$_3$/Ba(OAc)$_2$/5A | | 19 g NH$_3$ gas | | above | room | P | A | — | — |
| | | | 200 cc lime wsh on above | | | | W | A | | |
| F-24 | Lime wash above | | 200 cc lime wsh | | above | 100 | W | A | 59.6 | 380 |
| F-25 | | sample above | | | | 450 | C | A | 54.2 | 356 |
| F-26 | Ca Butyrate/5A | | dry ground | 2.24 | 21.36 | room | G | P | 111 | — |
| F-27 | | sample above | | | | 550 | M,C | P | 104 | 408 |
| F-28 | Ca Oleate/5A | | dry grind | 3.02 | 10.02 | 100 | G,M | P | | |
| | | | dry grind | above +20 g 5A | | 100 | G,M | P | | |
| | | | dry grind | above sample | | 550 | G,C | P | 98.7 | 426 |
| F-29 | Mg(OAc)$_2$ on | H$_2$O | .75 | .47 | 1.01 | 150 | I | Q | | |
| F-30 | Ca/Morden (C10) | | sample above | | | 550 | C | Q | 63.5 | — |
| F-31 | Mg(OAc)$_2$ on | H$_2$O | .75 | .47 | 1.01 | 150 | I | Q | | |
| F-32 | Ca/LZY82 (C14) | | sample above | | | 550 | C | Q | 87.5 | 402 |
| F-33 | Ca(OAc)$_2$ on | H$_2$O | .66 | .21 | 1.01 | 150 | I | Q | | |
| F-34 | Ca/Morden (C10) | | sample above | | | 550 | C | Q | 56.6 | 230 |
| F-35 | Ca(OAc)$_2$ on | H$_2$O | .77 | .24 | 1.05 | 150 | I | Q | | |
| F-36 | Ca/LZY82 (C14) | | sample above | | | 550 | C | Q | 87.7 | 486 |

| Description | Structure | | Basicity Resulting | | | |
|---|---|---|---|---|---|---|
| CATALYST | n-C8 | | | INDICATOR COLORS[i] | | |
| System Designation (Salt/Zeolite) | wetness cc/g[f] | Pore vol. cc/g[g] | pH 1% aq.[h] | 4-nitro-aniline/ DMSO | 4-chloro aniline/ DMSO | 4-nitro-aniline/ benzene | 4-chloro-aniline/ benzene |
|---|---|---|---|---|---|---|---|
| F-1 Sr(OAc)$_2$/5A | — | 0.171 | 7 | yellow | nd | nd | cream |
| F-2 | — | 0.214 | 10 | green solid | nd | nd | gray |
| F-3 Ba(OAc)$_2$/5A | — | 0.068 | 7 | yellow | nd | nd | cream |
| F-4 | — | 0.143 | 9 | dark gray | nd | nd | gray |
| F-5 Ca(OAc)$_2$/5A | — | 0.149 | 7 | yellow | gray | gray | cream |
| F-6 | — | 0.239 | 8 | light & dk grn | nd | nd | light gray |
| F-7 Ba(OAc)$_2$/5A | — | — | — | — | — | — | — |
| NH$_4$OH/Ba(OAc)$_2$/5A | | | | | | | |
| F-8 | — | 0.067 | 7 | yellow | nd | nd | cream |
| F-9 | — | 0.065 | 8 | light-green | lt-gray | lt-gray | v pale gray |
| F-10 Sr(OAc)$_2$/5A | — | — | — | — | — | — | — |
| NH$_4$OH/Sr(OAc)$_2$/5A | | | | | | | |
| F-11 | — | — | 7 | yellow | nd | nd | cream |
| F-12 | — | 0.254 | 8 | green | nd | nd | light gray |
| F-13 Mg(OAc)$_2$/5A | — | — | 7 | yellow | nd | nd | cream |
| F-14 | — | 0.309 | 8 | green | nd | nd | cream |
| F-15 Ba(OAc)$_2$/5A | — | — | — | — | — | — | — |
| K$_2$CO$_3$/Ba(OAc)$_2$/5A | | | | | | | |
| F-16 K$_2$CO$_3$ on above | — | — | 7 | yellow | nd | nd | cream |
| F-17 | — | 0.04 | 8 | dark green | nd | nd | pale gray |
| F-18 Sr(OAc)$_2$/5A | — | — | — | — | — | — | — |
| K$_2$CO$_3$/Sr(OAc)$_2$/5A | | | | | | | |
| F-19 K$_2$CO$_3$ on above | — | — | 8 | yellow | nd | nd | cream |
| F-20 | — | 0.11 | 9 | green | nd | nd | light gray |
| F-21 Mg(OAc)$_2$/5A | — | 0.28 | 7 | yellow | nd | nd | cream |
| F-22 | — | 0.325 | 8 | green | nd | nd | gray |
| F-23 Ba(OAc)$_2$/5A | — | — | — | — | — | — | — |
| NH$_o$/Ba(OAc)$_2$/5A | | | | | | | |
| F-24 Lime wash above | — | 0.291 | 7 | yellow | nd | nd | cream |
| F-25 | — | 0.268 | 8 | green | lt gray | olive | v lt-lav |
| F-26 Ca Butyrate/5A | — | — | 7 | yellow | nd | nd | beige |
| F-27 | — | 0.32 | 9 | lt-brown | pink-purple | olive/drab | lt-purple/bwn |
| F-28 Ca Oleate/5A | — | — | 6 | — | — | — | — |
| | — | 0.33 | 10 | green | nd | nd | purple |
| F-29 Mg(OAc)$_2$ on | | | | | | | |
| F-30 Ca/Morden (C10) | — | 0.122 | 8 | dk green | nd | nd | dk purple |
| F-31 Mg(OAc)$_2$ on | | | | | | | |
| F-32 Ca/LZY82 (C14) | — | 0.271 | 8 | dk green | nd | nd | dk purple |
| F-33 Ca(OAc)$_2$ on | | | | | | | |
| F-34 Ca/Morden (C10) | — | 0.15 | 8 | dk gray | nd | nd | dk gray |
| F-35 Ca(OAc)$_2$ on | | | | | | | |

| | | ILLUSTRATIVE EMBODIMENTS | | | | | |
|---|---|---|---|---|---|---|---|
| F-36 | Ca/LZY82 (C14) | — | 0.299 | 8 | dk gray | nd | nd | dk purple |

Footnotes:
[a] Maximum temperature used in drying (calcining) the particular material, in degrees Centigrade.
[b] General method of preparation. I = Impregnation; S = Slurry (Exchange in a wash of salt solution); M = impregnation with molten salt; G = gas; P = precipitation; I = impregnation with solvent alone to redistribute material; C = calcination.
[c] Closest example in text, by code letter.
[d] Percent crystallinity by X-ray diffraction comparison to best available standard sample material by ASTM D3906-80.
[e] Surface area in square meters/gram by two point nitrogen absorption on a Digisorb 2500 using Micromeritics program.
[f] Amount of n-octane, cc/g, necessary to make the catalyst powder appear moist.
[g] Pore volume in cubic centimeters per gram, determined by nitrogen absorption with the equipment and software of [e].
[h] pH of a one percent suspension of the catalyst in deionized (Barnstead, 20 meg ohm) water, read with pH paper after 20 minutes.
[i] Color of a suspension of about 60 mg of catalyst in about .1 cc of a 10% weight solution of the indicator solution listed, by a modification of the method of Tanabe (in Solid Acids and Bases, Academic Press, 1970). The leftmost system probably indicates pH of about 16 or more, while the rightmost system should indicate pH of 27 or more, according to Tanabe. No entry means no color change relative to the indicator solution itself. (orng = orange, orangish; yell = yellow; grn = green, greenish; dk = dark; bwn = brown, brownish; lt = light; sl = slight; ex = extremely; dp = deep; w/ = with; nd = not determined; liq = liquid, purp = purple, lvnder = lavender)
[j] Y = zeolite Y; LZY = Linde zeolite Y type from Union Carbide Corporation; SDUSY = super dealuminated ultrastable zeolite Y; OAC = acetate; plt = pellet; VUSY = very ulta stable zeolite Y; USY = ultra stable zeolite Y.
[k] Pellets contain approximately 20% alumina
[l] Super Dealuminated USY; $SiO_2/Al_2O_3$ about 25.

ISOMERIZATION PROCESS

Background

Double bond isomerization is a reaction catalyzed by basic and acidic catalysts. Basic catalysts are normally more selective, since they do not generate cations which can undergo skeletal isomerizations. The instant compositions are particularly useful for double bond isomerization.

NaY zeolite itself is reported in the literature to catalyze cracking processes by a radical mechanism. The cracking observed along with isomerization by NaY zeolite is largely consistent with the reported radical mechanism, perhaps with a contribution from weak acid sites. When NaY zeolite and CaY zeolites are converted to the instant compositions, the resulting products lose their cracking activity.

The instant composition are thus particularly useful for the isomerization of additive range ($C_4$ to $C_8$) olefins and detergent range ($C_{10}$ to $C_{18}$) olefins, although higher range olefins can be isomerized. Isomerization is carried out in a gas or liquid phase at isomerization conditions. Isomerization conditions typically include a temperature in the range of from about 0° C. to about 500° C., preferably from about 100° C. to about 150° C., a pressure in the range of from about 1 psig to about 2000 psig and a weight hourly space velocity in the range of from 0.1 to about 20.

Catalyst Preparation

The catalysts utilized were prepared as follows:
Fully metal exchanged zeolites Calcium-A (5A), Sodium-X (13X) and Sodium-Y (LZY-52) were used as comparative catalysts in an isomerization test and to prepare the basified catalysts of the instant invention.

CA-1

60.72 Grams of 5A zeolite pellets and 1 liter Barnstead water were stirred for approximately 16 hrs, then filtered. An additional 900 cc Barnstead water was poured through the filter funnel. The cake was then dried for 1 hour in a 150° C. vacuum oven.

A-1

20.02 Grams of the washed 5A zeolite above were impregnated with 3.93 g $Ca(NO_3)_2.4H_2O$ dissolved in 1.59 cc water. The zeolite was mixed in a pyrex dish during impregnation, and allowed to sit 9 minutes before drying 1 hour in a 150° C. vacuum oven. The zeolite was then impregnated with 4 cc water. After sitting 29 minutes, the zeolite was dried 70 minutes in a 150° C. vacuum oven. The powder was stirred with 100 cc 1N KOH for 1 hour, then filtered. The cake was stirred with an additional 100 cc 1N KOH for 1 hour, then filtered, and dried overnight in a 150° C. vacuum oven.

CA-2

60.91 Grams of 13X zeolite pellets were stirred overnight with 1 liter Barnstead water, then filtered. An additional 900 cc water was poured through the filter funnel. The zeolite was dried 1 hour in a 150° C. vacuum oven.

A-2

20.0 Grams of the washed 13X zeolite above were impregnated with 3.93 g $Ca(NO_3)_2.4H_2O$ dissolved in 1.59 cc Barnstead water. The zeolite was mixed in a pyrex dish during impregnation, then allowed to sit 12 minutes, and then dried 62 minutes in a 150° C. vacuum oven. The zeolite was then impregnated with 4 cc water, allowed to sit 31 minutes, then dried 65 minutes in a 150° C. vacuum oven. The dried powder was stirred with 100CC 1N KOH for 1 hour then filtered. The cake was then stirred with an additional 100 cc 1N KOH for 1 hour, then filtered, then dried overnight in a 150° C. vacuum oven.

CA-3

130.4 Grams of LZY52 powder were stirred for 1 hour with 1.5 liters water, then filtered. An additional 400 cc water was poured through the filter. The cake was dried 1 hour in a 150° C. vacuum oven.

A-3

20.03 Grams of the washed LZY52 powder above were impregnated with 3.93 g $Ca(NO_3)_2.4H_2O$ dissolved in 1.59 cc water. The zeolite was mixed in a pyrex dish during impregnation, allowed to sit 15 minutes, then dried 62 minutes in a 150° C. vacuum oven. The zeolite was then impregnated with 4 cc water, allowed to sit 31 minutes, then dried 70 minutes in a 150°±C. vacuum oven. The dried powder was stirred 65 minutes with 100 cc 1N KOH, then filtered. The cake was stirred 1 hour with an additional 100 cc 1N KOH, filtered and dried overnight in a 150° C. vacuum oven.

A-4

20.02 Grams of the washed LZY52 powder above were impregnated with 4.37 g $Mg(NO_3)_2.6H_2O$ dissolved in 2.40 cc water. The zeolite was mixed in a pyrex dish during impregnation, allowed to sit 37 minutes, then dried 105 minutes in a 150° C. vacuum oven. The zeolite was then impregnated with 4 cc water, allowed to sit 24 minutes, then dried 67 minutes in a 150° C. vacuum oven. The dried powder was stirred 53 minutes with 100 cc 1N KOH, then filtered. The cake was stirred overnight with an additional 100 cc 1N KOH, filtered and dried overnight in a 150° C. vacuum oven.

The catalysts and comparative catalysts are listed in Table 4.

TABLE 4

| Catalyst No. | Isomerization Catalyst | |
|---|---|---|
| | Zeolite | Basifying Agent |
| CA-1 | 5A(Ca-A) | none |
| A-1 | 5A(Ca-A) | Ca(OH)$_2$ |
| CA-2 | 13X(Na-X) | none |
| A-2 | 13X(NA-X) | Ca(OH)$_2$ r |
| CA-3 | LZY-52(Na-Y) | none |
| A-3 | LZY-52(Na-Y) | Ca(OH)$_2$ |
| A-4 | LZY-52(Na-Y) | MgO |

Catalyst Testing

Isomerization catalysts were tested in a stainless steel flow reactor measuring 14.75" in length and 0.625" in internal diameter. The reactor was packed from top to bottom as follows: a small wad of glass wool, 25 cc of 60-80 grit SiC 14 cc of catalyst, a small wad of glass wool, 10 cc 60-80 grit silicon carbide, followed by another small wad of glass wool. The reactor was operated in a vertical mode in an upright furnace. During isomerization the reactor was heated to 275° C. under a nitrogen flow rate of about 20 liters per hour and a 1-octene flow rate of about 10 grams per hour. After one hour of operation the reaction was stopped and organic liquid trapped in an attached cold trap was analyzed and the results reported in Table 5. The temperature was then increased to 400° C. and the next isomerization test was conducted with organic liquid sample being collected for one hour of operation for analysis.

TABLE 5

| | Isomerization of 1-Octene | | |
|---|---|---|---|
| Catalyst No. | Temp °C. | Cracking wt % | Double Bond Isom mole % |
| CA-1 | 400 | 4.4 | 39.5 |
| A-1 | 400 | <0.1 | 57.1 |
| CA-2 | 400 | 62.3 | 10.3 |
| A-2 | 400 | ~0.4 | 45.9 |
| CA-3 | 275 | 7.8 | 42.1 |
| CA-3 | 400 | 8.7 | 36.5 |
| A-3 | 275 | <0.2 | 12.2 |
| A-3 | 400 | 0-.6 | 49.9 |
| A-4 | 275 | ~0.01 | 59.2 |
| A-4 | 400 | <0.3 | 78.3 |

As can be seen from Table 5, the basified zeolites of the instant invention produce significantly less cracking than the corresponding non-basified zeolites and are more active.

I claim:

1. A composition prepared by impregnating a zeolite with a solution of an alkaline earth metal salt wherein the sum of said alkaline earth metal impregnated into the zeolite and any metal cation exchanged into the zeolite is in excess of that required to provide a fully metal cation-exchanged zeolite, followed by drying the thus impregnated zeolite and calcining the dried zeolite at a temperature ranging from about 150° C. to about 850° C.

2. The composition of claim 1 wherein the impregnated zeolite is contacted with a precipitating agent whereby an insoluble alkaline earth metal compound precipitates within the zeolite.

3. The composition of claim 2 wherein the precipitating agent is an aqueous solution of a hydroxyl-containing compound.

4. The composition of claim 3 wherein the precipitating agent is an aqueous solution of an hydroxide of alkali metal, ammonium and mixtures thereof.

5. The composition of claim 2 wherein the precipitating agent is selected from hydroxide, sulfate, carbonate and mixtures thereof.

6. The composition of claim 2 wherein the precipitating agent is selected from ammonia, carbon dioxide, sulfur trioxide and mixtures thereof.

7. The composition of claims 1 or 2 wherein the impregnated zeolite is additionally impregnated with a solution of a soluble alkali metal salt.

8. The composition of claim 1 wherein the calcination is carried out at a temperature ranging from about 200° C. to about 750° C.

9. The composition of claim 8 wherein the calcination is carried out at a temperature ranging from about 200° C. to about 600° C.

10. A composition prepared by impregnating a zeolite with a solution of an alkaline earth metal salt wherein said alkaline earth metal salt is thermally decomposable upon calcination in the presence of said zeolite and wherein the sum of said alkaline earth metal impregnated into the zeolite and any metal cation exchanged into the zeolite is in excess of that required to provide a fully metal cation-exchanged zeolite, drying the thus impregnated zeolite and calcining the zeolite at a temperature in excess of the temperature at which the alkaline earth metal salt thermally decomposes.

11. The composition of any one of claims 1 or 10 wherein the alkaline earth metal salt is selected from an alkaline earth metal nitrate or carboxylate.

12. A process for preparing a composition-of-matter comprising a zeolite and an alkaline earth metal compound which comprises impregnating a zeolite with a solution of an alkaline earth metal salt wherein the sum of said alkaline earth metal impregnated into the zeolite and any metal cation exchanged into the zeolite is in excess of that required to provide a fully metal cation-exchanged zeolite, followed by drying the thus impregnated zeolite and calcining the dried zeolite at a temperature ranging from about 150° C. to about 850° C.

13. The process of claim 12 wherein the impregnated zeolite is contacted with a precipitating agent whereby an insoluble alkaline earth metal compound precipitates within the zeolite.

14. The process of claim 13 wherein the precipitating agent is a basic agent.

15. The process of claim 13 wherein the precipitating agent is selected from hydroxide, sulfate, carbonate and mixtures thereof.

16. The process of claim 13 wherein the precipitating agent is an aqueous solution of a hydroxyl-containing compound.

17. The process of claim 13 wherein the precipitating agent is an aqueous solution of an hydroxide of alkali metal, ammonium and mixtures thereof.

18. The process of claim 13 wherein the precipitating agent is selected from ammonia, carbon dioxide, sulfur trioxide and mixtures thereof.

19. The process of claims 12, 13, 14, 15, 16 or 17 wherein the impregnated zeolite is additionally impregnated with a solution of a soluble alkali metal salt.

20. The process of claim 12 wherein the calcination is carried out at a temperature ranging from about 200° C. to about 750° C.

21. The process of claim 20 wherein the calcination is carried out at a temperature ranging from about 200° C. to about 600° C.

22. A process for preparing a composition-of-matter comprising a zeolite and an alkaline earth metal compound which comprises impregnating a zeolite with a solution of an alkaline earth metal salt wherein said alkaline earth metal salt is thermally decomposable upon calcination in the presence of said zeolite and wherein the sum of said alkaline earth metal impregnated into the zeolite and any metal cation exchanged into the zeolite is in excess of that required to provide a fully metal cation-exchanged zeolite, drying the thus impregnated zeolite and calcining the zeolite at a temperature in excess of the temperature at which the alkaline earth metal salt thermally decomposes.

23. A process for preparing a composition-of-matter comprising a zeolite and an alkaline earth metal compound which comprises impregnating a zeolite with a solution of an alkaline earth metal salt wherein the sum of said alkaline earth metal impregnated into the zeolite and any metal cation exchanged into the zeolite is in excess of that required to provide a fully metal cation-exchanged zeolite, drying the thus impregnated zeolite and calcining the zeolite at a temperature sufficient to convert the impregnated zeolite to a form which tests as basic when placed in a solvent.

24. A process for preparing a composition-of-matter comprising a zeolite and an alkaline earth metal compound which comprises impregnating a zeolite with a solution of an alkaline earth metal salt wherein said alkaline earth metal salt is decomposable upon calcination in the presence of said zeolite and wherein the sum of said alkaline earth metal impregnated into the zeolite and any metal cation exchanged into the zeolite is in excess of that required to provide a fully metal cation-exchanged zeolite, drying the thus impregnated zeolite and calcining the zeolite at a temperature sufficient to at least partially decompose the alkaline earth metal salt and convert the impregnated zeolite to a form which tests as basic when place in a solvent.

* * * * *